(12) United States Patent
Hara et al.

(10) Patent No.: US 9,357,144 B2
(45) Date of Patent: May 31, 2016

(54) IMAGE PROCESSING APPARATUS, IMAGING DEVICE, IMAGE PROCESSING METHOD, AND COMPUTER-READABLE RECORDING MEDIUM

(71) Applicants: Takayuki Hara, Kanagawa (JP); Kazuhiro Yoshida, Kanagawa (JP); Yoshikazu Watanabe, Tokyo (JP); Akira Kataoka, Kanagawa (JP)

(72) Inventors: Takayuki Hara, Kanagawa (JP); Kazuhiro Yoshida, Kanagawa (JP); Yoshikazu Watanabe, Tokyo (JP); Akira Kataoka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 18 days.

(21) Appl. No.: 14/370,280

(22) PCT Filed: Jan. 4, 2013

(86) PCT No.: PCT/JP2013/050346
§ 371 (c)(1),
(2) Date: Jul. 2, 2014

(87) PCT Pub. No.: WO2013/103154
PCT Pub. Date: Jul. 11, 2013

(65) Prior Publication Data
US 2014/0347526 A1 Nov. 27, 2014

(30) Foreign Application Priority Data
Jan. 6, 2012 (JP) ................................. 2012-001599

(51) Int. Cl.
*H04N 5/217* (2011.01)
*H04N 5/357* (2011.01)
(Continued)

(52) U.S. Cl.
CPC ................ *H04N 5/357* (2013.01); *G06T 5/002* (2013.01); *H04N 5/2173* (2013.01); *H04N 5/361* (2013.01);
(Continued)

(58) Field of Classification Search
CPC ....... H04N 5/357; H04N 9/045; H04N 5/361; H04N 5/2173; H04N 1/409; G06T 5/002; G06T 2207/20192; G06T 2207/20012; G06T 2207/20016

USPC .................................. 348/241, 243, 246, 247
See application file for complete search history.

(56) References Cited

U.S. PATENT DOCUMENTS

2003/0152287 A1 8/2003 Nakajima et al.
2005/0231628 A1* 10/2005 Kawaguchi ........ G06K 9/00255
348/345

(Continued)

FOREIGN PATENT DOCUMENTS

JP   2002-259965       9/2002
JP   2005-318554 A    11/2005

(Continued)

OTHER PUBLICATIONS

Hiroshi Harashima, et al., "ε-Separating Nonlinear Digital Filter and Its Applications", IEICE Transactions A, vol. J65-A, No. 4, (1982), pp. 297-304 (submitting English translation only).

(Continued)

*Primary Examiner* — Yogesh Aggarwal
(74) *Attorney, Agent, or Firm* — Oblon, McClelland, Maier & Neustadt, L.L.P

(57) ABSTRACT

An image processing apparatus includes a decimating unit configured to decimate pixels in a target image to obtain a decimated image containing a smaller number of pixels than the target image; an extracting unit configured to extract similar pixels at each of which a similarity to a pixel of interest is a threshold or more, from a region containing the pixel of interest among pixels of the decimated image; a first calculating unit configured to calculate a correction candidate value based on pixel values of the similar pixels; a second calculating unit configured to calculate a correction candidate value for each decimated pixel, based on the correction candidate value calculated for each pixel of the decimated image; and a correcting unit configured to correct a target pixel value of a target pixel in the target image, based on the correction candidate value calculated by the first or second calculating unit.

13 Claims, 13 Drawing Sheets

(51) Int. Cl.
*G06T 5/00* (2006.01)
*H04N 5/361* (2011.01)
*H04N 9/04* (2006.01)
*H04N 1/409* (2006.01)

(52) U.S. Cl.
CPC ...... *H04N 9/045* (2013.01); *G06T 2207/20012* (2013.01); *G06T 2207/20016* (2013.01); *G06T 2207/20192* (2013.01); *H04N 1/409* (2013.01)

(56) References Cited

U.S. PATENT DOCUMENTS

| | | |
|---|---|---|
| 2007/0216951 A1 | 9/2007 | Shiraishi |
| 2007/0242875 A1 | 10/2007 | Tanaka et al. |
| 2010/0066868 A1 | 3/2010 | Shohara |
| 2010/0194933 A1 | 8/2010 | Sasaki |
| 2011/0249151 A1 | 10/2011 | Ito |
| 2011/0274350 A1 | 11/2011 | Hara |
| 2011/0317045 A1* | 12/2011 | Vakrat ............... G06T 5/002 348/242 |
| 2012/0050585 A1 | 3/2012 | Shiraishi |
| 2012/0121203 A1 | 5/2012 | Hara |
| 2012/0229829 A1 | 9/2012 | Hara |
| 2012/0257089 A1 | 10/2012 | Shohara |

FOREIGN PATENT DOCUMENTS

| | | |
|---|---|---|
| JP | 2007-288439 | 11/2007 |
| JP | 2008-205737 | 9/2008 |
| JP | 2010-087769 | 4/2010 |
| JP | 2010-092461 | 4/2010 |
| JP | 2010-178302 | 8/2010 |
| JP | 2010-218110 | 9/2010 |
| JP | 2011-86275 A | 4/2011 |

OTHER PUBLICATIONS

CC. Tomasi and R. Manduchi, "Bilateral Filtering for Gray and Color Images" Proc. Sixth Int'l Conf. Computer Vision, pp. 839-846, 1998.

Ce Liu, et al., "Automatic Estimation and Removal of Noise from a Single Image," IEEE Trans. Pattern Analysis and Machine Intelligence, vol. 30, No. 2, pp. 299-314, 2008.

International Search Report issued Apr. 9, 2013 in PCT/JP2013/050346 filed on Jan. 4, 2013.

Extended Search Report issued Jul. 9, 2015 in European Patent Application No. 13733908.1.

Takayuki Hara, et al., "Noise Reduction for Color CCD Image Sensors Based on Constraint of Mean Color and Local Variance Estimation of Noise and Texture", The Institute of Electronics, Information and Communication Engineers, IEICE Technical Report, XP009184936, 2009, 14 pages (with English abstract and Machine Translation of cols. 1-8 ).

Korean Office Action issued Oct. 19, 2015 in Patent Application No. 10-2014-7017880 (with English Translation).

* cited by examiner

MEAN

UPSAMPLING

APPLY LOW-PASS FILTER

US 9,357,144 B2

IMAGE PROCESSING APPARATUS, IMAGING DEVICE, IMAGE PROCESSING METHOD, AND COMPUTER-READABLE RECORDING MEDIUM

TECHNICAL FIELD

The present invention relates to an image processing apparatus, an imaging device, an image processing method, and a computer-readable recording medium.

BACKGROUND ART

Images captured by an imaging device, such as a digital camera or a scanner, contain noise, such as shot noise or dark current noise, due to the characteristics of an imaging element and a circuit. To obtain high-quality images from the captured images, it is necessary to reduce noise in the images. However, if a low-pass filter is simply used to reduce noise, elements, such as edges, that are important in human perception of the images are also lost while reducing the noise, resulting in low image quality. Therefore, it is necessary to adaptively reduce noise according to the characteristics of image regions.

As noise reduction technologies, an s-filter and a bilateral filter have been developed (see Non-Patent Document 1 (Hiroshi Harashima, Kaoru Odajima, Yoshiaki Shishikui, Hiroshi Miyakawa "$\epsilon$-Separating Nonlinear Digital Filter and Its Applications", IEICE Transactions A, Vol. J65-A, No. 4, pp. 297-304, 1982) and Non-Patent Document 2 (C C. Tomasi and R. Manduchi, "Bilateral Filtering for Gray and Color Images" Proc. Sixth Int'l Conf. Computer Vision, pp. 839-846, 1998)). With the $\epsilon$-filter, if filtering is performed based on neighboring pixels at which signal differences from a pixel of interest are equal to or smaller than a predetermined threshold, noise can be reduced while components, such as edges, having greater signal differences can be preserved (see Non-Patent Document 1).

Similarly to the $\epsilon$-filter, the bilateral filter can enable edge preserving and noise reduction at the same time (see Non-Patent Document 2). The bilateral filter is a technique for performing filtering according to a weight coefficient that is generated based on a signal difference and a spatial distance from a pixel of interest. Other noise reductions based on the principle equivalent to the bilateral filter have also been proposed (see, for example, Patent Document 1 (Japanese Patent Application Laid-open No. 2007-288439), Patent Document 2 (Japanese Patent Application Laid-open No. 2008-205737), Patent Document 3 (Japanese Patent Application Laid-open No. 2010-178302), and Patent Document 4 (Japanese Patent Application Laid-open No. 2010-087769)).

Furthermore, Patent Document 5 (Japanese Patent Application Laid-open No. 2010-218110) discloses a technology for reducing signal-dependent noise in color images without performing iterative processing, such as segmentation. This technology is based on the principle equivalent to the $\epsilon$-filter. Specifically, a similar pixel group around a pixel of interest is selected and the characteristics of the similar pixel group are reflected in a conversion process to convert a difference between a result obtained by operation using the $\epsilon$-filter and a pixel value to be processed.

However, the conventional noise reduction process has a problem with an increase in costs. For example, in the process disclosed in Patent Document 5, it is necessary to perform filtering operation at all of the pixel positions in an image, so that a calculation cost can hardly be reduced. Furthermore, Non-Patent Document 3 (Ce Liu, et al., "Automatic Estimation and Removal of Noise from a Single Image," IEEE Trans. Pattern Analysis and Machine Intelligence, vol. 30, no. 2, pp. 299-314, 2008) discloses a technology for reducing signal-dependent noise in a color image. However, in this method, large processing costs are needed for image segmentation or statistics calculation.

Therefore, there is a need to provide an image processing apparatus, an imaging device, an image processing method, and a computer-readable recording medium capable of reducing a processing cost in a noise reduction process on images.

DISCLOSURE OF INVENTION

It is an object of the present invention to at least partially solve the problems in the conventional technology.

According to an embodiment, there is provided an image processing apparatus that includes a decimating unit configured to decimate pixels in a target image to be processed to obtain a decimated image containing a smaller number of pixels than the target image; a similar pixel extracting unit configured to extract similar pixels at each of which a similarity to a pixel of interest to be processed is equal to or greater than a first threshold, from a region containing the pixel of interest among pixels contained in the decimated image; a first correction-candidate-value calculating unit configured to calculate a correction candidate value used to correct a pixel value, based on pixel values of the similar pixels; a second correction-candidate-value calculating unit configured to calculate a correction candidate value for each of the pixels decimated by the decimating unit, based on the correction candidate value calculated for each of the pixels contained in the decimated image; and a correcting unit configured to correct a target pixel value of a target pixel to be corrected in the target image, based on the correction candidate value calculated for the target pixel by the first correction-candidate-value calculating unit or by the second correction candidate value calculating unit.

According to another embodiment, there is provided an imaging device that includes an imaging unit configured to capture an image; the image processing apparatus according to the above embodiment; a function storage unit configured to store therein a plurality of noise variance estimating functions, each indicating a relationship between the correction candidate value of the target pixel and the noise variance value of each of the similar pixels of the target pixel and each being associated with an imaging condition set in the imaging unit; an acquiring unit configured to acquire an imaging condition set in the imaging unit or an imaging condition input from an external apparatus; a function selecting unit configured to select a noise variance estimating function that is stored in the function storage unit in association with the imaging condition acquired by the acquiring unit; a noise variance value calculating unit configured to calculate the noise variance value of the target pixel based on the noise variance estimating function selected by the function selecting unit and based on the correction candidate value; and a weight coefficient calculating unit configured to calculate a weight coefficient of the target pixel value and the correction candidate value of the target pixel based on the noise variance value. The correcting unit corrects the target pixel value by performing weighted addition of the target pixel value and the correction candidate value by using the weight coefficient.

According to still another embodiment, there is provided an image processing method implemented by an image processing apparatus. The image processing method includes decimating pixels in a target image to be processed to obtain a decimated image containing a smaller number of pixels the target image; extracting similar pixels at each of which a similarity to a pixel of interest to be processed is equal to or greater than a first threshold, from a region containing the pixel of interest among pixels contained in the decimated image; calculating a correction candidate value used to correct a pixel value, based on pixel values of the similar pixels; calculating a correction candidate value for each of the pixels decimated at the decimating, based on the correction candidate value calculated for each of the pixels contained in the decimated image; and correcting a target pixel value of a target pixel to be corrected in the target image, based on the correction candidate value calculated for the target pixel at the calculating for correcting a pixel value or the calculating for each of the pixels decimated at the decimating.

According to still another embodiment, there is provided a computer-readable recording medium with an executable program stored thereon. The program instructs a computer to perform: decimating pixels in a target image to be processed to obtain a decimated image containing a smaller number of pixels the target image; extracting similar pixels at each of which a similarity to a pixel of interest to be processed is equal to or greater than a first threshold, from a region containing the pixel of interest among pixels contained in the decimated image; calculating a correction candidate value used to correct a pixel value, based on pixel values of the similar pixels; calculating a correction candidate value for each of the pixels decimated at the decimating, based on the correction candidate value calculated for each of the pixels contained in the decimated image; and correcting a target pixel value of a target pixel to be corrected in the target image, based on the correction candidate value calculated for the target pixel at the calculating for correcting a pixel value or the calculating for each of the pixels decimated at the decimating.

The above and other objects, features, advantages and technical and industrial significance of this invention will be better understood by reading the following detailed description of presently preferred embodiments of the invention, when considered in connection with the accompanying drawings.

BEST MODE (S) FOR CARRYING OUT THE INVENTION

Exemplary embodiments of an image processing apparatus, an imaging device, an image processing method, and a program will be explained in detail below with reference to the accompanying drawings.

First Embodiment

Figure 1:
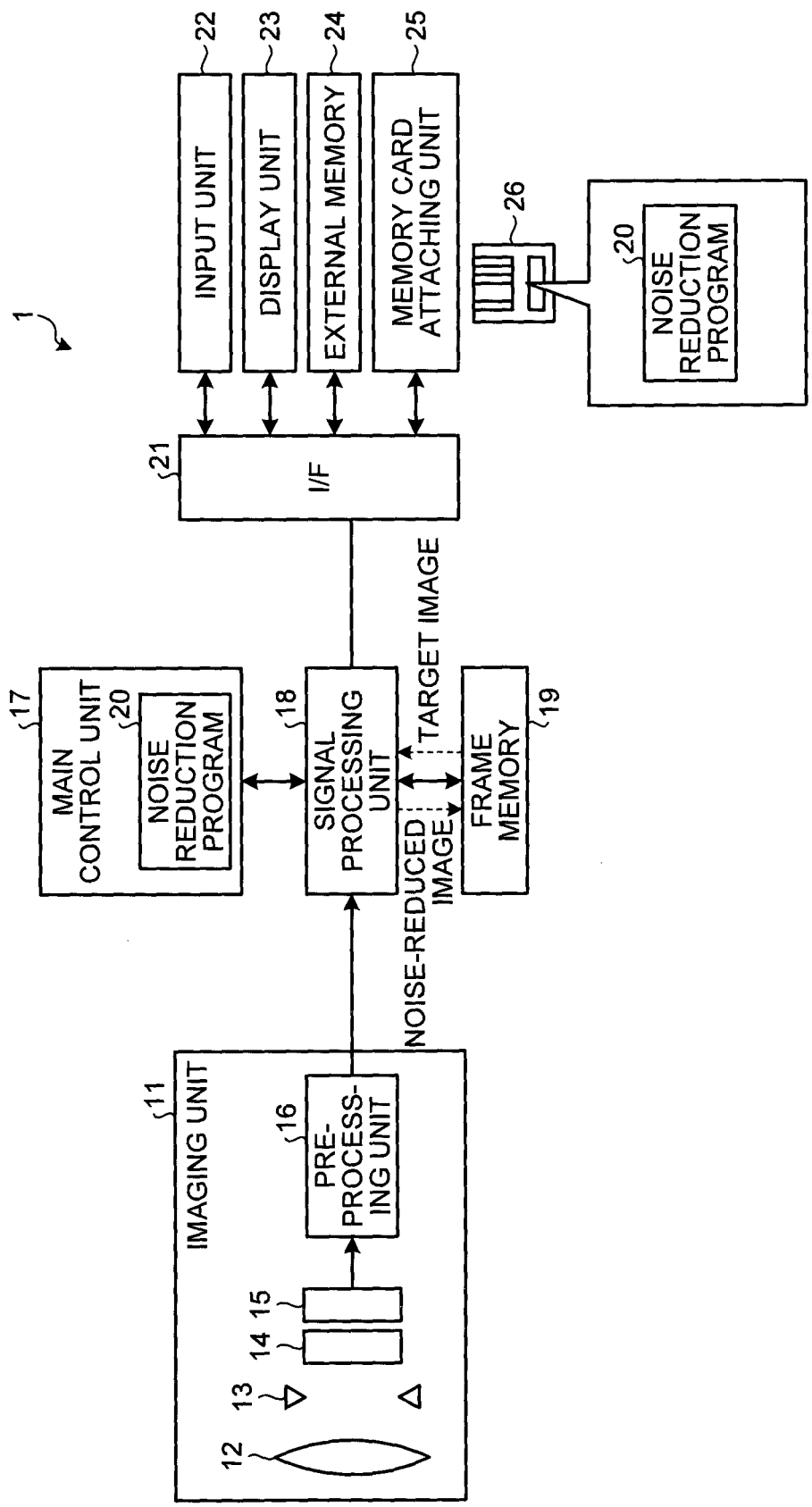
FIG. 1 is a block diagram illustrating an overall configuration of an imaging device according to a first embodiment.

FIG. 1 is a block diagram illustrating an overall configuration of an imaging device 1 according to a first embodiment. Specific examples of the imaging device 1 include a digital camera. The imaging device 1 includes an imaging unit 11 that captures an image, a signal processing unit 18 that processes an image signal obtained from the imaging unit 11, a main control unit 17 that controls the entire imaging device 1, a frame memory 19 for storing image data, and an I/F (interface) 21 for enabling connections with various devices. The I/F 21 is connected to an input unit 22 that receives an input from a user, a display unit 23 that displays an image or the like, an external memory 24 for storing image data or reading out image data, and a memory card attaching unit 25 for attaching a storage medium 26.

The imaging unit 11 includes a lens 12, a diaphragm 13, an electronic shutter 14, a photoelectric conversion element 15, and a preprocessing unit 16. The photoelectric conversion element 15 is, for example, a complementary metal oxide semiconductor (CMOS) or a charge coupled device (CCD). The imaging unit 11 includes a color filter (either a primary-color system or a complementary-color system is applicable (not illustrated)), and one photoelectric conversion element 15 is arranged for each of R, G, and B that are arranged in a cellular manner for example. The preprocessing unit 16 includes an analog signal processor, such as a preamplifier or an automatic gain controller (AGC), or includes an analog-to-digital (A/D) converter. The preprocessing unit 16 performs preprocessing, such as amplification or clamping, on an analog image signal output by the photoelectric conversion element 15, and thereafter converts the analog image signal to a digital image signal.

The signal processing unit 18 includes a digital signal processor (DSP) or the like, and performs various types of image processing, such as color separation, white balance adjustment, or gamma correction, on the digital signal obtained from the imaging unit 11. The signal processing unit 18 stores the processed image data in the frame memory 19, reads out the image data stored in the frame memory 19, or performs image processing, such as noise reduction, on the read-out image data.

The frame memory 19 is a semiconductor memory, such as a VRAM, an SRAM, or a DRAM, and stores therein image data or the like. The image data read out from the frame memory 19 is subjected to signal processing, such as image compression, by the signal processing unit 18. Thereafter, the image data is stored in the external memory 24 via the I/F 21 or in the storage medium 26 attached to the memory card attaching unit 25.

The external memory 24 is a nonvolatile memory, such as a flash memory. The storage medium 26 is a removable and portable nonvolatile memory, such as a USB memory, an SD memory card, or a magnetooptical disc.

The imaging device 1 may further include a communication unit (not illustrated) and may transmit image data stored in the external memory 24 or the like to a server or the like. The imaging device 1 may receive image data from the server or the like via the communication unit and stores the image data in the external memory 24 or the like. In this case, the communication unit is connected to a mobile telephone network or a wired/wireless LAN network to transmit and receive the image data.

The display unit 23 displays image data or the like read out from the frame memory 19, the external memory 24, or the storage medium 26. The display unit 23 is, for example, a liquid crystal display or an organic EL display, and is mounted on a body of the imaging device 1. The display unit 23 includes a touch panel serving as the input unit 22 in an integrated manner. The input unit 22 receives user operation through the touch panel and a keyboard provided on the body.

The main control unit 17 and the signal processing unit 18 include a microcomputer, an LSI, or the like. The microcomputer is a computer, in which a CPU, a RAM, an EEPROM, an ASIC, and the like are connected to one another via a bus. When the CPU executes a noise reduction program 20 stored in the EEPROM, a noise reduction process explained below is performed on the image data.

The noise reduction program 20 is stored in the EEPROM serving as the main control unit 17 in advance, and is provided together with the imaging device 1. It may be possible to distribute the noise reduction program 20 by storing it in the storage medium 26 and loading it on the EEPROM serving as the main control unit 17 via the I/F 21. It may also be possible to download the noise reduction program 20 to the EEPROM via a network.

Figure 2:
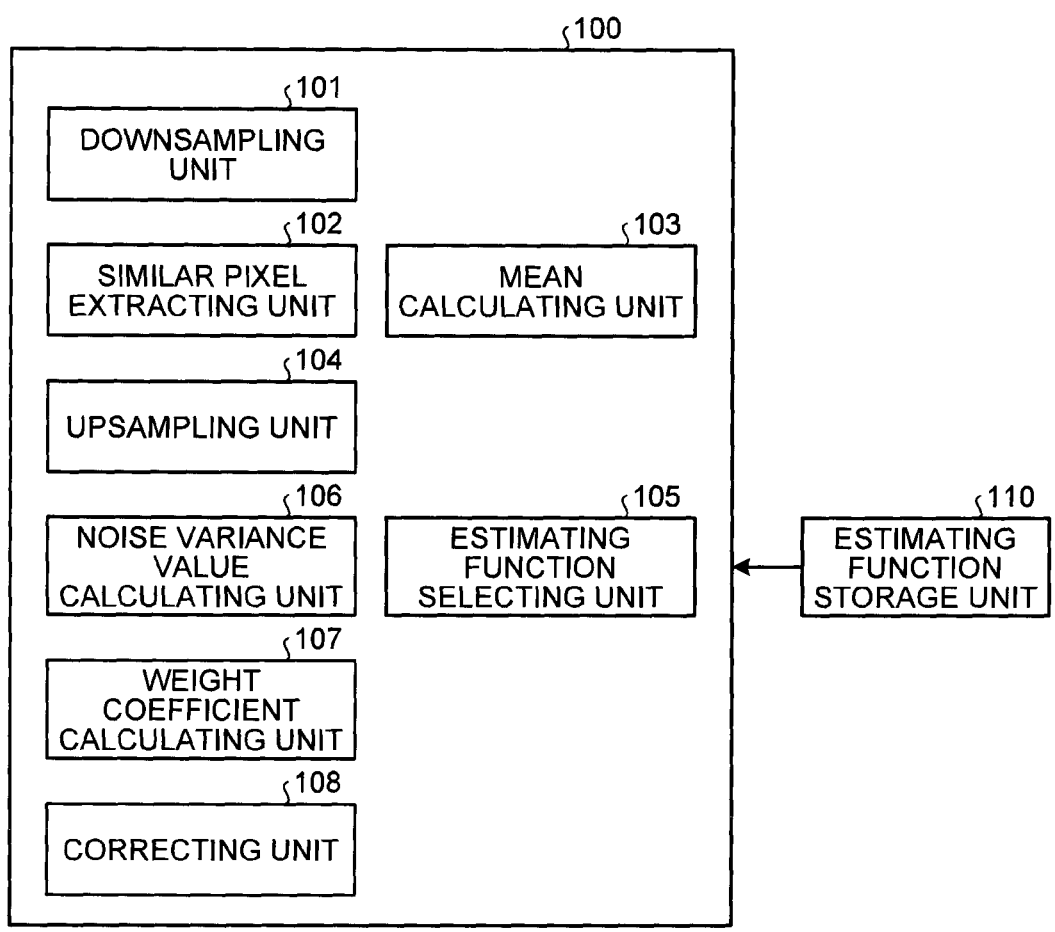
FIG. 2 is a block diagram illustrating a functional configuration of an image processing unit that performs a noise reduction process.

FIG. 2 is a block diagram illustrating a functional configuration of an image processing unit 100 that performs the noise reduction process. The image processing unit 100 is realized by the main control unit 17, the signal processing unit 18, the frame memory 19, and the noise reduction program 20 illustrated in FIG. 1. The image processing unit 100 performs the noise reduction process on a target image as a processing object, which is an image obtained by the imaging unit 11 or an image stored in the frame memory 19. The image processing unit 100 according to the first embodiment performs the noise reduction process for reducing noise dependent on a signal value, that is, a pixel value, from a grayscale image to be processed, in which each pixel has only a luminance component.

As another example, it may be possible to employ the image processing unit 100 that performs the noise reduction process by hardware, such as an ASIC.

The image processing unit 100 includes a downsampling unit 101, a similar pixel extracting unit 102, a mean calculating unit 103, an upsampling unit 104, an estimating function selecting unit 105, a noise variance value calculating unit 106, a weight coefficient calculating unit 107, and a correcting unit 108.

The downsampling unit 101 acquires a grayscale image as a target image to be processed, from the frame memory 19 or the like. The target image may be an image stored in the storage medium 26 instead of an image captured by the imaging unit 11. The downsampling unit 101 acquires a downsampled image containing a smaller number of pixels than the target image, by decimating pixels in the target image at a predetermined rate.

Figure 3:
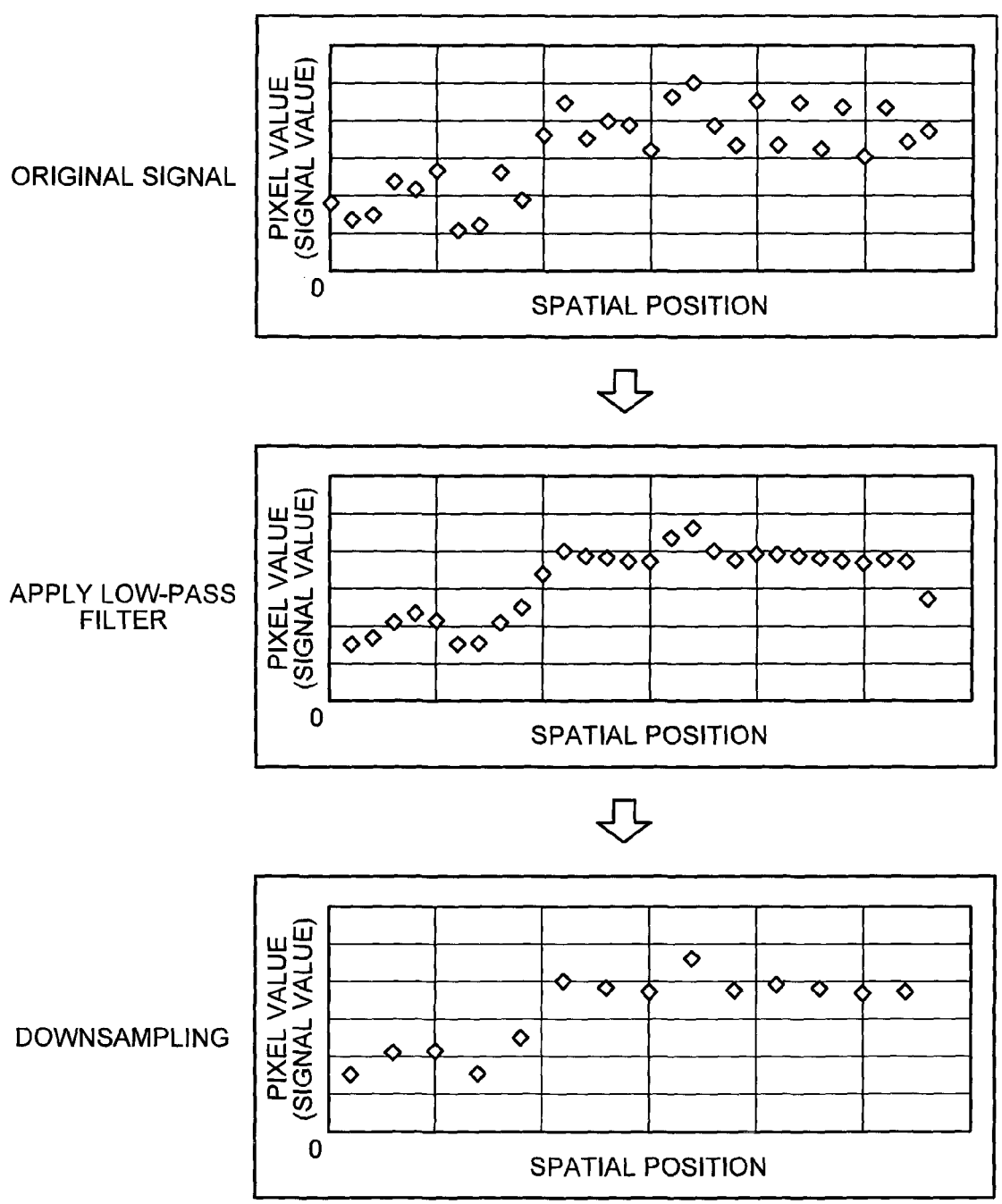
FIG. 3 is a diagram for explaining a process performed by a downsampling unit.

FIG. 3 is a diagram for explaining a process performed by the downsampling unit 101. As illustrated in FIG. 3, the downsampling unit 101 applies a low-pass filter to a target image. Consequently, low-frequency components with a predetermined frequency or lower are extracted. In other words, the downsampling unit 101 functions as a low-frequency component extracting unit.

The downsampling unit 101 obtains a downsampled image by decimating pixels in the target image at a predetermined rate after applying the low-pass filter. In other words, the downsampling unit 101 functions as a decimating unit that obtains a downsampled image (decimated image) having a smaller number of pixels than the target image. In FIG. 3, one-dimensionally arranged pixel values are illustrated for convenience of explanation; however, the downsampling unit 101 performs downsampling in two directions, that is, in the horizontal direction and the vertical direction, of the target image. In the example illustrated in FIG. 3, the pixel values are smoothed by applying a low-pass filter (121)/4, and the number of pixels of the target image is reduced to half.

In this way, the downsampling unit 101 according to the first embodiment applies a low-pass filter to the target image to smooth the target image before performing downsampling. Therefore, it is possible to prevent occurrence of aliasing, enabling to lower a noise level in a downsampled image.

Referring back to FIG. 2, the similar pixel extracting unit 102 selects a pixel of interest from the downsampled image obtained by the downsampling unit 101. The similar pixel extracting unit 102 sequentially selects, as the pixel of interest, all of the pixels from the downsampled image by using a scanning method, such as raster scan.

Figure 4:
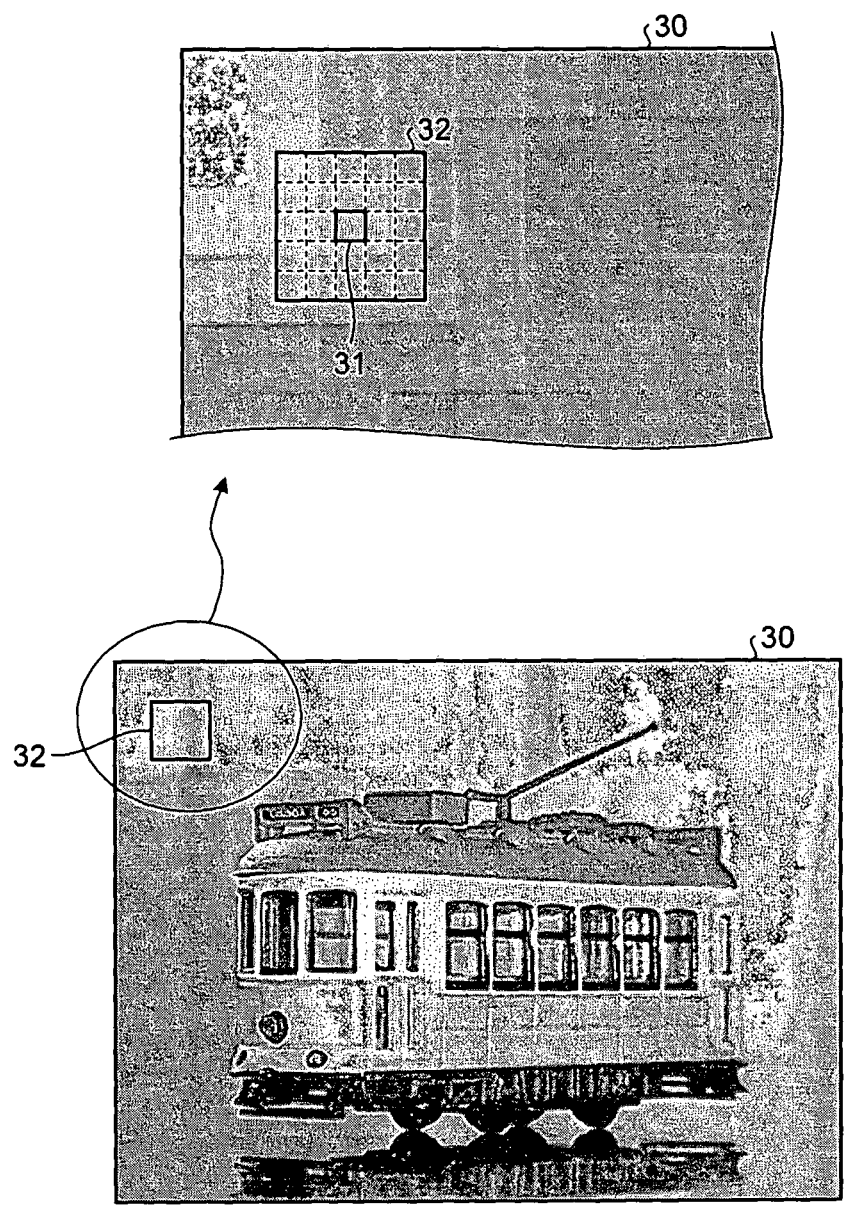
FIG. 4 is a diagram for explaining a window.

The similar pixel extracting unit 102 sets a window in the target image such that the pixel of interest is located in the center of the window. FIG. 4 is a diagram for explaining the window. A window 32 is a rectangular region with a predetermined size, in which a pixel of interest 31 is located in the center, in a target image 30. The window 32 illustrated in FIG. 4 is a window of 5×5 pixels. As long as the window is a region that includes the pixel of interest, the shape and the size of the window are not limited to the embodiment but can be set in an arbitrary manner.

Figure 5:
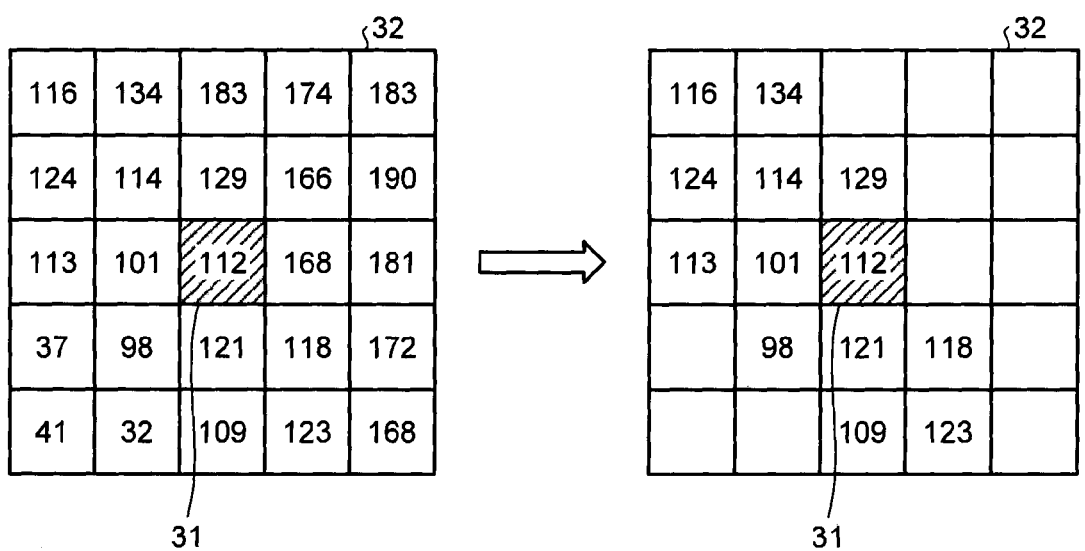
FIG. 5 is a diagram for explaining a process for extracting similar pixels.

The similar pixel extracting unit 102 extracts similar pixels at each of which a similarity to the pixel of interest is equal to or greater than a predetermined threshold, from among all of the pixels in the window. Specifically, the similar pixel extracting unit 102 calculates an absolute value (absolute difference value) between the pixel value of each of the pixels and the pixel value of the pixel of interest, and extracts a pixel having the absolute difference value equal to or smaller than the threshold, as the similar pixel having the similarity equal to or greater than the threshold with respect to the pixel of interest. FIG. 5 is a diagram for explaining a process for extracting the similar pixel. In FIG. 5, an example is illustrated in which pixels having absolute difference values of 30 or smaller are extracted as the similar pixels. Hereinafter, a plurality of similar pixels extracted by the similar pixel extracting unit 102 for a pixel of interest is described as a similar pixel group.

Referring back to FIG. 2, the mean calculating unit 103 calculates a mean of the pixel values of the similar pixel group extracted by the similar pixel extracting unit 102. The mean calculated by the mean calculating unit 103 is a value, in particular, a correction candidate value, to be used in a process for correcting the pixel value of a pixel of interest to reduce noise in the target image (to be described later). In other words, the mean calculating unit 103 functions as a first correction-candidate-value calculating unit that calculates the correction candidate value used to correct the pixel value of a pixel of interest.

In the image processing unit 100 according to the first embodiment, the mean of the similar pixel group is used as the correction candidate value. However, the correction candidate value is not limited to the mean of the similar pixel group. It may be possible to use any value, such as a square mean value or a standard deviation value of the similar pixel group, determined based on the pixel values of the similar pixel group.

The image processing unit 100 according to the first embodiment uses, as the correction candidate value, the mean of the similar pixels extracted for a pixel of interest, rather than a mean of all of the neighboring pixels around the pixel of interest. Therefore, it is possible to calculate, as the correction candidate value, a value (mean) that is not influenced by a portion, such as an edge region, where pixel values greatly change.

The upsampling unit 104 upsamples the means calculated by the mean calculating unit 103 for the respective pixels in the downsampled image, and obtains a mean of a similar pixel group, i.e., the correction candidate value, for each of the pixels that have been decimated (discarded) by the downsampling. Furthermore, the upsampling unit 104 applies a low-pass filter to the means obtained for the respective pixels of the downsampled image and to the means obtained for the respective decimated pixels, so that the means obtained for all of the pixels of the target image can be smoothed.

Figure 6:
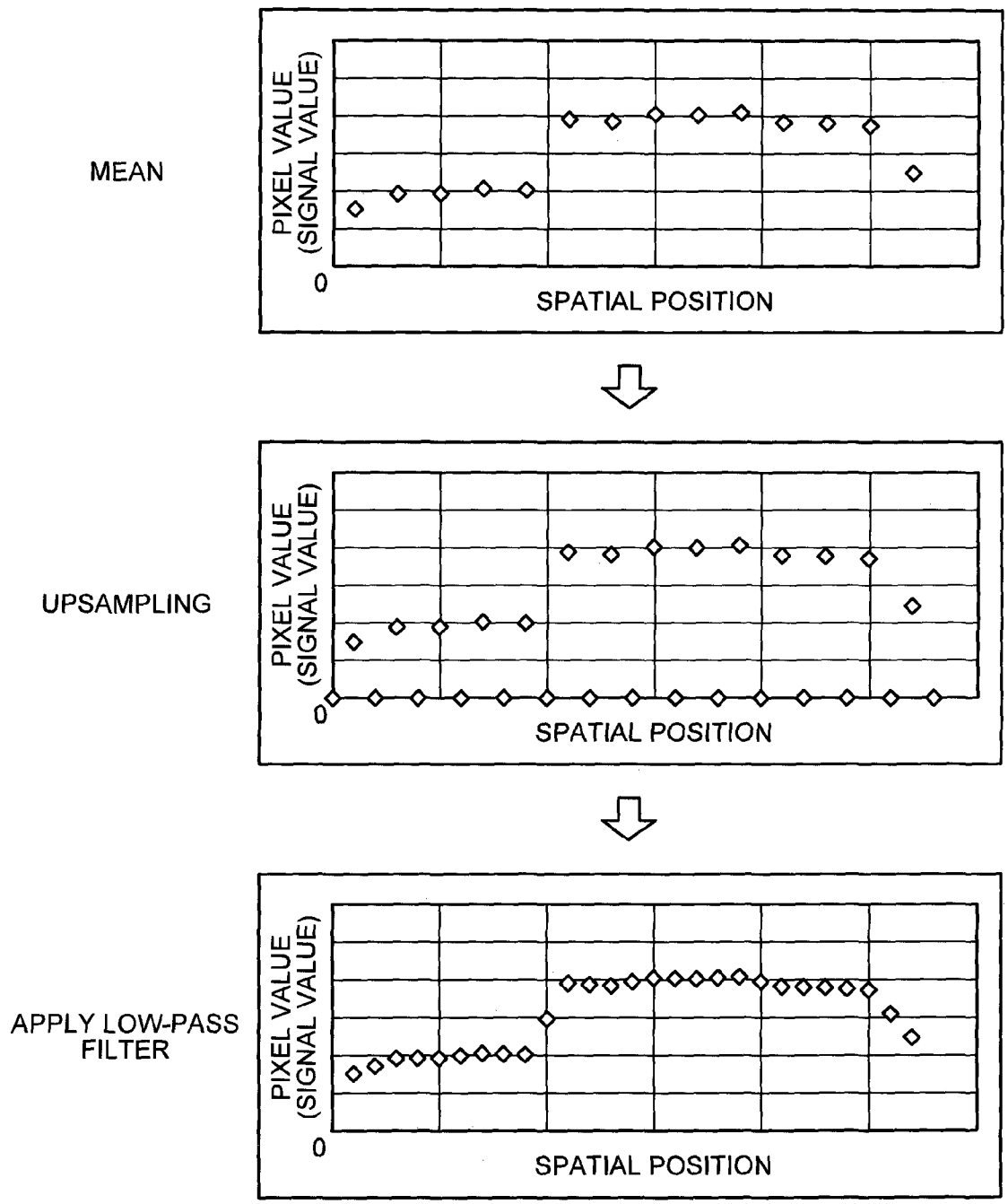
FIG. 6 is a diagram for explaining a process performed by an upsampling unit.

FIG. 6 is a diagram for explaining a process performed by the upsampling unit 104. In the example illustrated in FIG. 6, the upsampling unit 104 first performs double-upsampling by inserting values "zero" between the means that have been calculated by the mean calculating unit 103 for all of the pixels of the downsampled image. Subsequently, the upsampling unit 104 applies a low-pass filter to the means obtained by upsampling, to thereby perform smoothing. Therefore, means of the decimated pixels are calculated. In the example illustrated in FIG. 6, a low-pass filter (121)/2 is applied. In other words, the upsampling unit 104 functions as a second correction-candidate-value calculating unit that calculates, as the correction candidate value, the mean for each of the pixels decimated by the downsampling unit 101.

The above process performed by the upsampling unit 104 is the same as a linear interpolation process between the means of the pixels of the downsampled image. Therefore, for another example, the upsampling unit 104 may calculate the means of the decimated pixels by performing linear interpolation between the means of the pixels of the downsampled image instead of performing the above process. In this way, as long as the upsampling unit 104 can calculate the means of the decimated pixels based on the means of the pixels of the downsampled image, specific processes are not limited to those described in the embodiments.

Furthermore, although FIG. 6 illustrates the example in which the means are upsampled in one dimension for convenience of explanation, the upsampling unit 104 performs upsampling and smoothing processes in each of the vertical direction and the horizontal direction of a target image.

Referring back to FIG. 2, an estimating function storage unit 110 stores therein an estimating function for estimating a noise variance value from the mean. The noise variance value indicates noise variance of the similar pixel group obtained for a target pixel that is to be corrected among the pixels of the target image. Specifically, the estimating function storage unit 110 is realized by a storage means, such as the frame memory 19 or the external memory 24 illustrated in FIG. 1.

Figure 7:
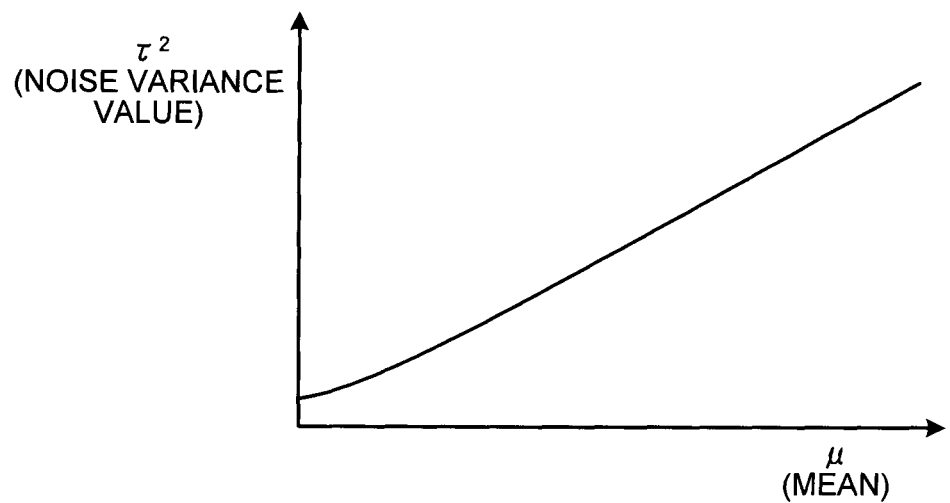
FIG. 7 is a diagram illustrating an estimating function.

FIG. 7 is a diagram illustrating the estimating function. As illustrated in FIG. 7, the estimating function is a function where a noise variance value ($\tau^2$) increases along with an increase in a mean ($\mu$).

Figure 8:
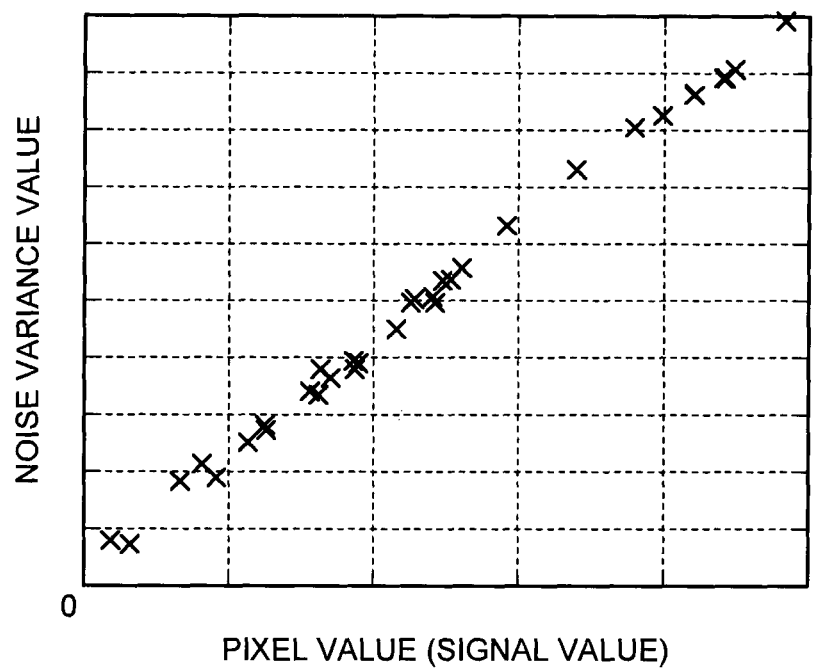
FIG. 8 is a diagram illustrating a graph on which a relationship between a pixel value and a noise variance value is plotted.

The noise variance value will be explained below. In general, the magnitude of shot noise that appears in an image captured by a CCD or a CMOS is dependent on a signal value (pixel value). FIG. 8 is a diagram illustrating a graph on which an exemplary relationship between a pixel value and a noise variance value is plotted.

As illustrated in FIG. 8, the pixel value and the noise variance value are highly correlated. Therefore, it is possible to estimate the noise variance from the pixel value with high accuracy through regression of the plot. However, a true pixel value cannot be obtained from a noise-reduced image. Therefore, in the imaging device 1 according to the first embodiment, the noise variance value ($\tau^2$) is calculated based on the mean ($\mu$) of the similar pixel group instead of based on the pixel value. Specifically, the estimating function as illustrated in FIG. 7 is set in advance and is stored in the estimating function storage unit 110. The magnitude of noise varies depending on imaging conditions, such as an ISO speed, at the time of image shooting. Therefore, estimating functions are stored in the estimating function storage unit 110 in association with the imaging conditions. Namely, the estimating function storage unit 110 stores therein a plurality of estimating functions each being associated with an imaging condition.

Specifically, an estimating function can be specified by capturing a patch image under each imaging condition, regarding a variation in signal values on the patch as noise, and applying a least squares method to the obtained signal values.

The estimating function selecting unit 105 selects an estimating function associated with the imaging condition from the estimating function storage unit 110 on the basis of an imaging condition used to capture a target image. When the target image is an image obtained by the imaging unit 11, the estimating function selecting unit 105 acquires the image from the imaging unit 11. When the target image is an image stored in a memory, the estimating function selecting unit 105 acquires imaging condition information stored with the image.

Referring back to FIG. 2, the noise variance value calculating unit 106 calculates a noise variance value ($\tau^2$) of each of the pixels based on the mean ($\mu$) that has been obtained by the upsampling unit 104 for each of the pixels in the target image, by using the estimating function selected by the estimating function selecting unit 105.

The noise variance value calculating unit 106 according to the first embodiment calculates the noise variance values ($\tau^2$) from the means ($\mu$) according to the estimating function. However, as another example, it may be possible to use a lookup table that can specify the noise variance values ($\tau^2$) from the means ($\mu$) like the estimating function, instead of using the estimating function. In this case, it is assumed that the means ($\mu$) and the noise variance values ($\tau^2$) are associated in the lookup table.

The weight coefficient calculating unit 107 calculates a weight coefficient based on the mean ($\mu$) that has been obtained by the mean calculating unit 103 or the upsampling unit 104 for a target pixel to be corrected among the pixels contained in the target image and based on the noise variance value ($\tau^2$) that has been obtained by the noise variance value calculating unit 106 for the target pixel. The weight coefficient is a coefficient used by the correcting unit 108 to correct a pixel value of the target pixel to be corrected as will be described later. Specifically, a weight coefficient (w) is calculated by Expression (1) below.

$$w \leftarrow \alpha \times \frac{\tau^2}{\mu^2} \quad (1)$$

where α is an arbitrary design parameter.

The correcting unit 108 performs weighted addition of the pixel value of the target pixel and the mean (μ) obtained by the mean calculating unit 103 or the upsampling unit 104 for the target pixel. The correcting unit 108 replaces the pixel value of the target pixel with a correction value obtained by the weighted addition, to thereby correct the pixel value of the target pixel.

Specifically, the correcting unit 108 calculates the correction value by Expression (2) below.

$$x \leftarrow w \times \mu + (1-w) \times y \quad (2)$$

where x is the correction value and y is the pixel value of the target pixel. As indicated by Expression (2), the correction value x approaches the mean (μ) as the weight coefficient (w) approaches 1, and the mean (μ) approaches the original pixel value y of the target pixel as the weight coefficient (w) approaches zero.

By contrast, the weight coefficient calculating unit 107 calculates, as the weight coefficient, a relatively large value (a value close to 1) in a flat region or a region with a larger amount of noise, that is, in a region with large noise variance ($\tau^2$), according to Expression (1). Therefore, the correcting unit 108 corrects the target pixel value of the target pixel to a correction value that is closer to the mean, so that a larger amount of noise can be reduced.

On the other hand, the weight coefficient calculating unit 107 calculates, as the weight coefficient (w), a relatively small value (a value close to zero) in a textured region or a region with a smaller amount of noise, that is, in a region with smaller noise variance, according to Expression (1). Therefore, the correcting unit 108 corrects the target pixel value of the target pixel to a correction value closer to the original pixel value (y), so that a fine signal component can be preserved. By using the weighted addition in the above-described manner, it is possible to adaptively reduce noise in accordance with the characteristics of a local region of the target image.

The correcting unit 108 obtains a noise-reduced image by calculating correction values for all of the pixels in the target image and replacing the pixel values of all of the pixels in the target image with the calculated correction values, and outputs the noise-reduced image.

Figure 9:
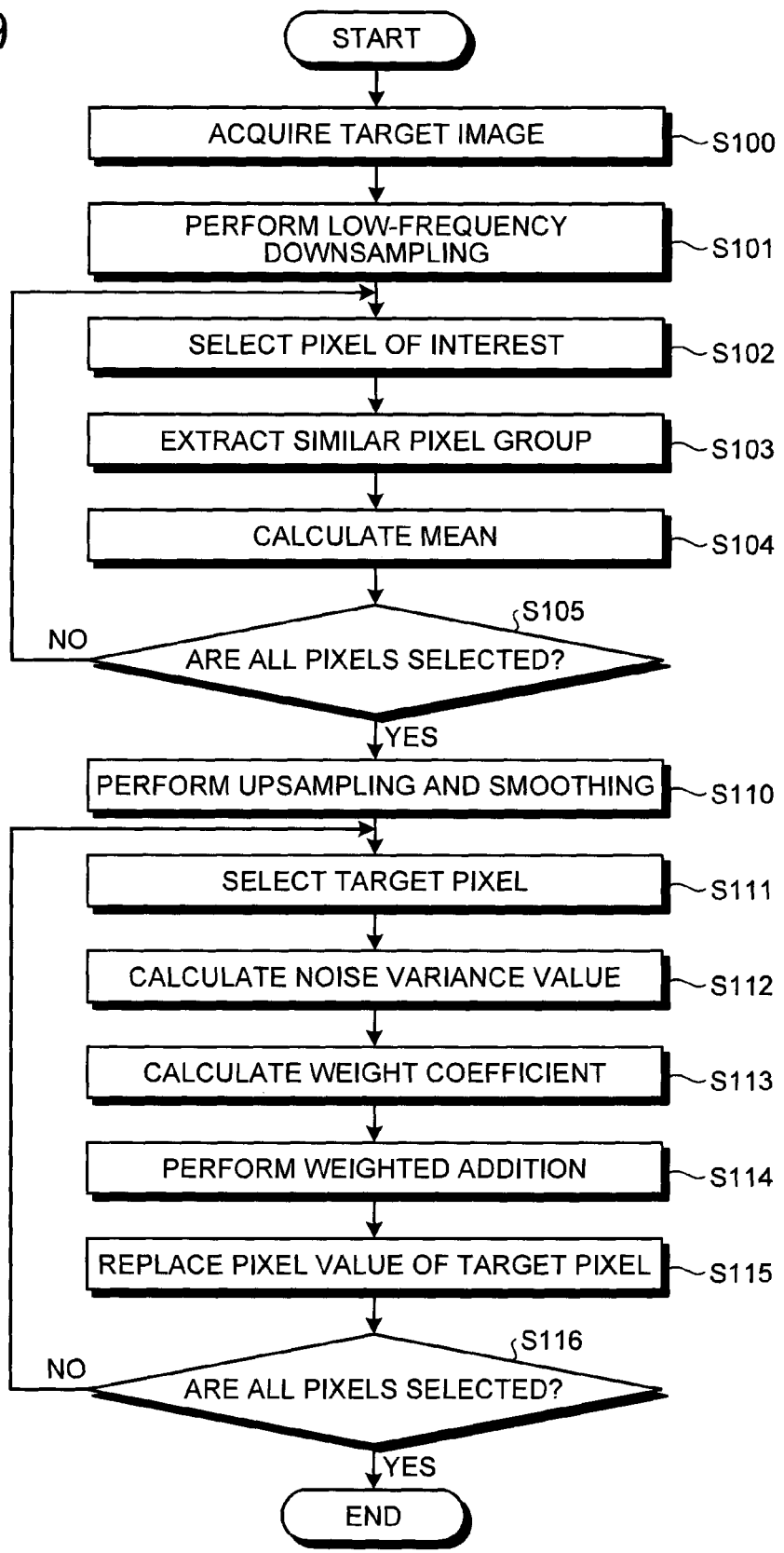
FIG. 9 is a flowchart of a noise reduction process performed by the image processing unit.

FIG. 9 is a flowchart of the noise reduction process performed by the image processing unit 100. In the noise reduction process, the downsampling unit 101 of the image processing unit 100 acquires a target image to be subjected to the noise reduction process from a storage means, such as the frame memory 19 (Step S100). Subsequently, the downsampling unit 101 extracts low-frequency components by using a low-pass filter, and decimates pixels from the target image at predetermined rate, to thereby obtain the downsampled image (Step S101).

The similar pixel extracting unit 102 selects a pixel of interest from the downsampled image (Step S102). Subsequently, the similar pixel extracting unit 102 sets a window with respect to the pixel of interest, and extracts, as a similar pixel group, pixels at which absolute difference values between the pixel values thereof and the pixel value of the pixel of interest become equal to or smaller than a threshold among all the pixels in the window, that is, a plurality of pixels each having the similarity equal to or greater than a threshold with respect to the pixel of interest (Step S103). The mean calculating unit 103 calculates the mean (μ) of the pixel values of the similar pixel group (Step S104).

When all of the pixels in the downsampled image are not selected as the pixel of interest (NO at Step S105), the process returns to Step S102, and the similar pixel extracting unit 102 selects a remaining pixel in the downsampled image as the pixel of interest (Step S102). At Step S105, when the processes from Step S102 to Step S104 are completed on all of the pixels in the downsampled image (YES at Step S105), the upsampling unit 104 performs upsampling and smoothing on a plurality of the means (μ) obtained for all of the pixels in the downsampled image (Step S110). Therefore, means (μ) of the pixels decimated in the target image by the downsampling unit 101 are calculated.

Subsequently, the noise variance value calculating unit 106 selects a target pixel to be subjected to a correction process from the target image (Step S111). The noise variance value calculating unit 106 calculates a noise variance value ($\tau^2$) of the target pixel based on the mean (μ) calculated by the mean calculating unit 103 or the upsampling unit 104 (Step S112). At this time, the estimating function selecting unit 105 selects an estimating function associated with the imaging condition of the target image in the estimating function storage unit 110. The noise variance value calculating unit 106 calculates the noise variance value ($\tau^2$) based on the selected estimating function and the mean (μ) of the target pixel.

Subsequently, the weight coefficient calculating unit 107 calculates a weight coefficient (w) based on the mean of the target pixel and the noise variance value by Expression (1) (Step S113). The correcting unit 108 performs weighted addition of the pixel value (y) of the target pixel and the mean (μ) of the target pixel by Expression (2) using the weight coefficient (w) of the target pixel, to thereby obtain a correction value (x) (Step S114). The correcting unit 108 replaces the pixel value of the target pixel with the correction value (x) (Step S115).

When all of the pixels in the target image are not selected as the target pixel (NO at Step S116), the process returns to Step S111, and the noise variance value calculating unit 106 selects a remaining pixel in the target image as the target pixel (Step S111).

At Step S116, when the processes from Step S111 to Step S115 are completed on all of the pixels in the target image (YES at Step S116), the noise reduction process on the target image is completed.

As described above, the image processing unit 100 according to the first embodiment calculates only the means of the pixels in the downsampled image that is obtained by downsampling by which pixels in the target image are decimated, rather than calculating the means of the pixel values of all of the pixels contained in the target image. Therefore, it is possible to reduce the calculations of the means.

For example, if the target image is downsampled to half both horizontally and vertically, the number of pixels in the downsampled image is reduced to one-fourth of the target image. Furthermore, the size of the window for extracting the similar pixel group is reduced to one-fourth. Therefore, the calculations can be reduced to one-sixteenth except for the calculations needed for the downsampling and the upsampling.

In general, if image processing is performed on a downsampled image, image resolution of the image with the original size is reduced. By contrast, the image processing unit 100 according to the first embodiment performs a weighted addition process of the pixel value and the mean of the target pixel after restoring the image to the original size, and therefore, the image resolution is less likely to be reduced.

Furthermore, the image processing unit 100 applies a low-pass filter to the target image before downsampling the target image. Therefore, a noise level of the downsampled image can be lower than the input image, so that a threshold for a signal difference used to extract the similar pixel group can be made smaller. Therefore, edge blurring is less likely to occur even in an image having a large amount of noise.

In this way, according to the imaging device 1 of the first embodiment, it is possible to adaptively change the degree of noise reduction according to noise variance in a local region of an image during the noise reduction process performed on the image.

In the image processing unit 100 according to the first embodiment, the weight coefficient calculating unit 107 calculates a weight coefficient by an estimating function based on a noise variance value calculated for each target pixel. However, as another example, the weight coefficient calculating unit 107 may use a constant design value as the noise variance value. Specifically, in this case, the imaging device 1 does not necessarily have to include the estimating function storage unit 110. Furthermore, the image processing unit 100 does not necessarily have to include the estimating function selecting unit 105 and the noise variance value calculating unit 106.

Second Embodiment

An imaging device according to a second embodiment will be explained below. In the imaging device according to the first embodiment, a weight coefficient is calculated based on the mean and the noise variance value of the similar pixel group of the target image. By contrast, the imaging device according to the second embodiment calculates a weight coefficient based on a variance value of pixel values (pixel variance value) and the noise variance value of the similar pixel group of the target image.

Figure 10:
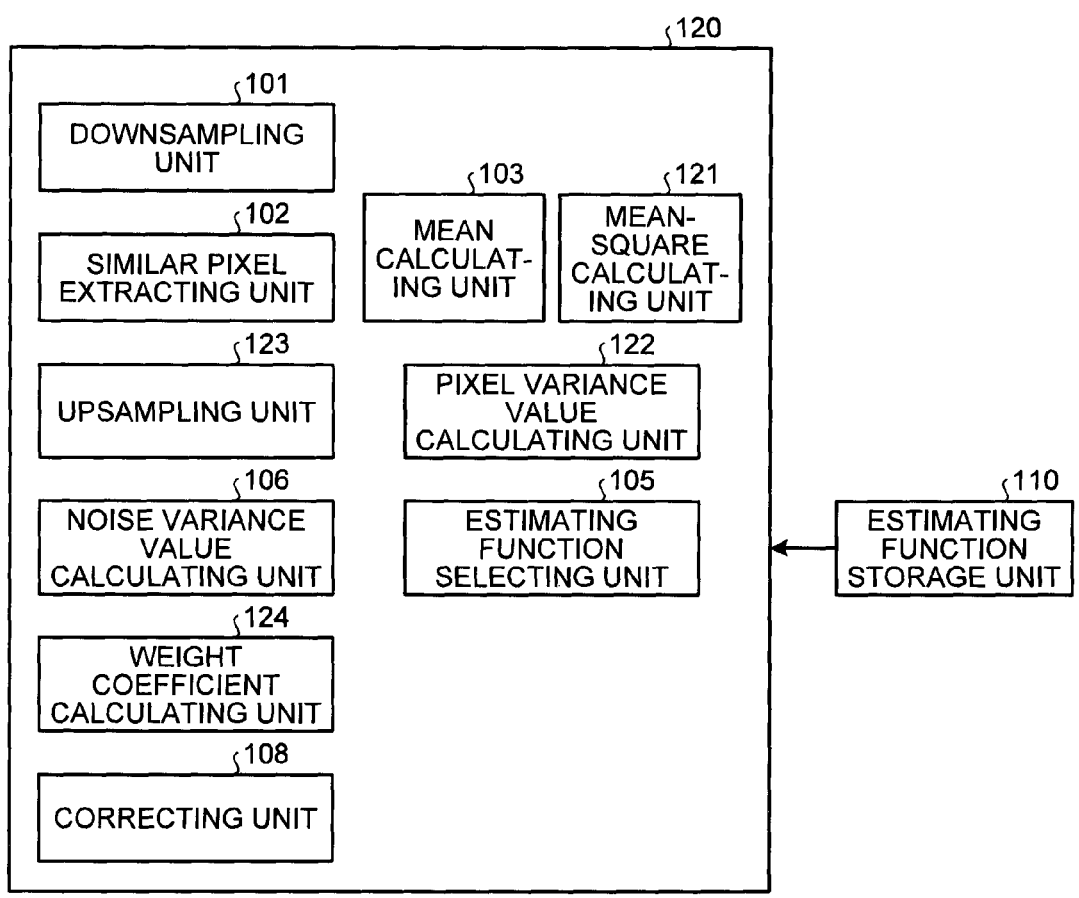
FIG. 10 is a block diagram illustrating a functional configuration of an image processing unit according to a second embodiment.

In the following, differences from the imaging device 1 according to the first embodiment will be explained. FIG. 10 is a block diagram illustrating a functional configuration of an image processing unit 120 according to the second embodiment. The image processing unit 120 includes a mean-square calculating unit 121 and a pixel variance value calculating unit 122, in addition to the functional configuration of the image processing unit 100 of the first embodiment.

The mean-square calculating unit 121 calculates mean squares of pixel values of the similar pixel group that is extracted by the similar pixel extracting unit 102 for a pixel of interest. The pixel variance value calculating unit 122 subtracts the square of the mean calculated by the mean calculating unit 103 for the pixel of interest from the mean square calculated by the mean-square calculating unit 121 for the pixel of interest, to thereby obtain a pixel variance value ($\sigma^2$) of the pixel of interest.

An upsampling unit 123 upsamples the means calculated by the mean calculating unit 103, and also upsamples the pixel variance values calculated by the pixel variance value calculating unit 122. The upsampling of the pixel variance values is performed in the same manner as the upsampling of the means explained above with reference to FIG. 6. Specifically, the upsampling unit 123 performs double-upsampling by inserting values "zero" between the pixel variance values of all of the pixels of the downsampled image, and thereafter applies a low-pass filter to perform smoothing. Consequently, pixel variance values of the decimated pixels are calculated.

Namely, the pixel variance value calculating unit 122 functions as a first pixel-variance-value calculating unit that calculates a pixel variance value of each of the pixels in the downsampled image, and the upsampling unit 123 functions as a second pixel-variance-value calculating unit that calculates a pixel variance value of each of the pixels decimated by the downsampling.

A weight coefficient calculating unit 124 calculates a weight coefficient (w) based on a pixel variance value ($\sigma^2$) and a noise variance value ($\tau^2$) of the similar pixel group of a target pixel by Expression (3) below.

$$w \leftarrow \frac{\tau^2}{\sigma^2} \qquad (3)$$

Figure 11:
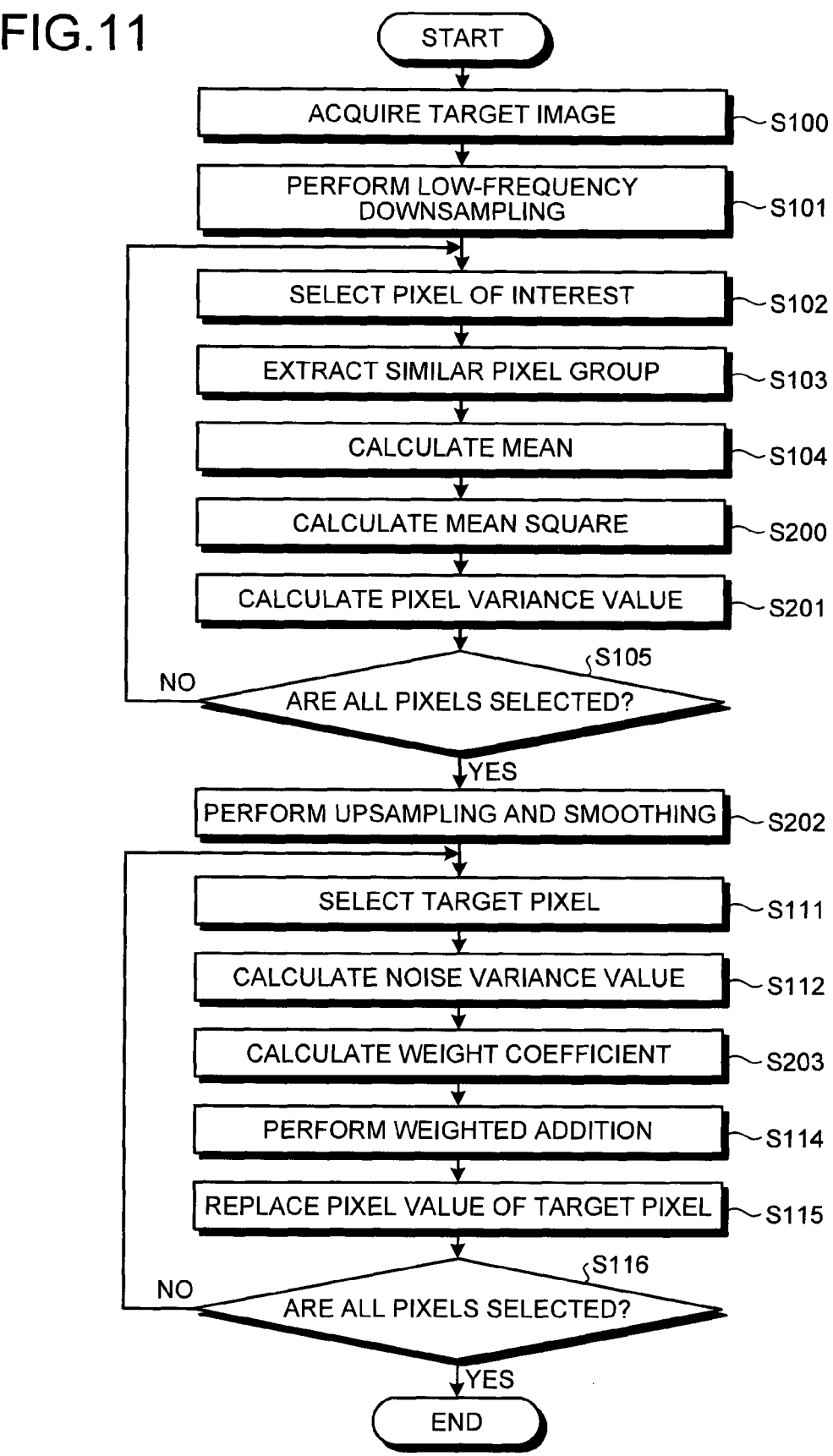
FIG. 11 is a flowchart of a noise reduction process performed by the image processing unit according to the second embodiment.

FIG. 11 is a flowchart of the noise reduction process performed by the image processing unit 120 according to the second embodiment. In the noise reduction process according to the second embodiment, after the mean calculating unit 103 completes the mean calculation process (Step S104), the mean-square calculating unit 121 calculates a mean square of the similar pixel group obtained for the pixel of interest (Step S200).

The pixel variance value calculating unit 122 subtracts the square of the mean from the mean square obtained for the pixel of interest, to thereby obtain a pixel variance value of the similar pixel group for the pixel of interest (Step S201).

When the processes from Step S102 to Step S201 are completed on all of the pixels contained in the downsampled image (YES at Step S105), the upsampling unit 123 performs upsampling and smoothing on the means ($\mu$) and the pixel variance values ($\sigma^2$) obtained for all of the pixels in the downsampled image (Step S202). Therefore, the means ($\mu$) and the pixel variance values ($\sigma^2$) of the pixels that have been decimated from the target image by the downsampling unit 101 are calculated.

At Step S112, when the noise variance value of a target pixel in the target image is calculated, the weight coefficient calculating unit 124 calculates the weight coefficient (w) based on the pixel variance value ($\sigma^2$) and the noise variance value ($\tau^2$) of the similar pixel group for the target pixel according to Expression (3) (Step S203).

Other configurations and processes of the imaging device according to the second embodiment are the same as those of the imaging device according to the first embodiment.

As described above, according to the imaging device of the second embodiment, similarly to the imaging device of the first embodiment, it is possible to adaptively change the degree of noise reduction according to noise variance in a local region of an image during the noise reduction process performed on the image.

Furthermore, the image processing unit 120 according to the second embodiment calculates the weight coefficient based on the pixel variance value and the noise variance value of the similar pixel group for the pixel of interest. Therefore, in the flat region, the pixel variance value of the similar pixel group becomes smaller and the weight coefficient approaches 1. Furthermore, the noise variance value becomes smaller than the pixel variance value of the similar pixel group. Therefore, according to the image processing unit 120 of the second embodiment, the maximum value of the weight coefficient becomes 1 except for an error. Consequently, the correction value (x) becomes closer to the mean, so that a smooth image can be obtained in the flat region.

On the other hand, in a rough region with texture, the pixel variance value of the similar pixel increases relative to the noise variance value and the weight coefficient approaches zero. Therefore, the correction value (x) approaches an original pixel value. Consequently, it is possible to maintain the texture and the image resolution in the rough region of the image.

As a modification of the imaging device according to the second embodiment, the weight coefficient calculating unit 124 may calculate the weight coefficient (w) by Expression (4) below instead of Expression (3).

$$w \leftarrow \alpha \times \frac{\tau^2}{\sigma^2} + \beta \qquad (4)$$

where $\alpha$ and $\beta$ are arbitrary design parameters. It is possible to adjust the degree of noise reduction by adjusting the design parameters $\alpha$ and $\beta$.

Third Embodiment

An imaging device according to a third embodiment calculates a weight coefficient based on a pixel variance value and a noise variance value of a similar pixel group for a target pixel, similarly to the imaging device according to the second embodiment. However, while the imaging device according to the second embodiment calculates the pixel variance values of the pixels of the downsampled image, the imaging device according to the third embodiment does not calculate the pixel variance values of the pixels of the downsampled image. The imaging device according to the third embodiment only calculates mean squares of the pixels of the downsampled image, and after upsampling is finished, calculates a pixel variance value of the target pixel based on the mean squares.

The functional configuration of an image processing unit of the imaging device according to the third embodiment is the same as that of the image processing unit 120 according to the second embodiment explained above with reference to FIG. 10.

In the image processing unit 120 according to the third embodiment, the upsampling unit 123 performs upsampling and smoothing on the means calculated by the mean calculating unit 103 and the mean squares calculated by the mean-square calculating unit 121. The upsampling and smoothing processes on the mean, squares are the same as those performed on the means explained above with reference to FIG. 6. Specifically, predetermined-times upsampling is first performed and smoothing is subsequently performed by applying a low-pass filter.

The mean-square calculating unit 121 and the upsampling unit 123 according to the third embodiment function as a first mean-square calculating unit and a second mean-square calculating unit, respectively.

The pixel variance value calculating unit 122 calculates a pixel variance value of a target pixel in a target image based on the mean squares that have been calculated by the mean-square calculating unit 121 for all of the pixels in the downsampled image or based on the mean squares that have been obtained by the upsampling unit 123 for the pixels decimated by the process performed by the downsampling unit 101.

Figure 12:
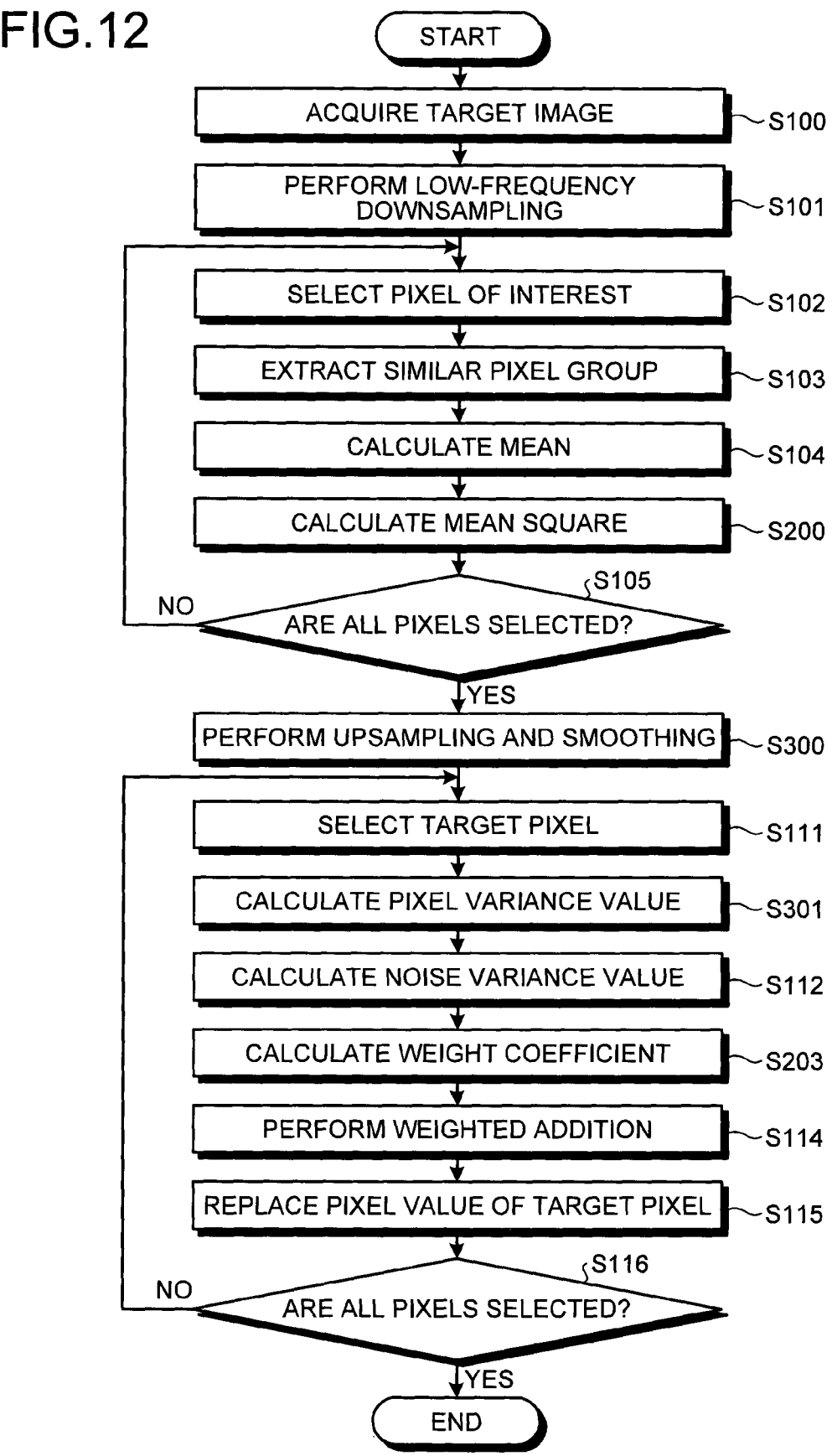
FIG. 12 is a flowchart of a noise reduction process performed by an image processing unit according to a third embodiment.

FIG. 12 is a flowchart of a noise reduction process performed by the image processing unit 120 according to the third embodiment. In the third embodiment, when a pixel of interest is selected (Step S102), the mean and the mean square of the similar pixel group of the pixel of interest are calculated (Step S104 and Step S200), and the process goes to the upsampling and smoothing processes without calculation of a pixel variance value (Step S300). At Step S300, the upsampling unit 123 performs upsampling and smoothing on the means and the mean squares.

When a target pixel is selected (Step S111), the pixel variance value calculating unit 122 calculates a pixel variance value of the target pixel based on the mean squares that have been calculated by the mean-square calculating unit 121 for the pixels in the downsampled image or based on the mean squares that have been calculated by the upsampling unit 123 for the pixels decimated by the downsampling (Step S301).

Other configurations and processes of the imaging device according to the third embodiment are the same as those of the imaging device according to the other embodiments.

As described above, according to the imaging device of the third embodiment, similarly to the imaging device of the other embodiments, it is possible to adaptively change the degree of noise reduction according to noise variance in a local region of an image during the noise reduction process performed on the image.

Furthermore, while the image processing unit 120 according to the second embodiment calculates the pixel variance values from the downsampled image and obtains a pixel variance value of each of the pixels of the target image by upsampling the pixel variance values obtained from the downsampled image, the image processing unit 120 according to the third embodiment only calculates a mean square of the similar pixel group from the downsampled image and thereafter calculates a pixel variance value from the mean square of each of the pixels in a target image that is obtained by upsampling. Due to a difference in the calculation method of the pixel variance values, the degree of edge preserving effect in the noise reduction process differs between the imaging device of the second embodiment and the imaging device of the third embodiment.

Explanation will be given below of a process for calculating a pixel variance value of a pixel $x_2$ decimated by downsampling in the noise reduction process according to the second and the third embodiments. A pixel variance value $(x_n)$ is obtained by Equation (5) below, where $E(x_n)$ is a mean of the similar pixel group corresponding to a pixel $x_n$, $E(x_n^2)$ is a mean square of the similar pixel group corresponding to a pixel $x_n$, and $V(x_n)$ is a pixel variance value of the pixel $x_n$.

$$V(x_n) = E(x_n^2) - E(x_n)^2 \qquad (5)$$

When a pixel variance value of the pixel $x_2$ is calculated by the noise reduction process according to the second embodiment, linear interpolation of pixel variance values calculated for a pixel $x_1$ and a pixel $x_3$ is performed. In this case, a pixel variance value $V'(x_2)$ of the pixel $x_2$ is obtained by Equation (6) below.

$$V'(x_2) = \frac{E(x_1^2) - E(x_1)^2 + E(x_3^2) - E(x_3)^2}{2} \qquad (6)$$

Incidentally, when the pixel variance value of the pixel $x_2$ is calculated by the noise reduction process according to the third embodiment, the pixel variance value is calculated by using mean squares calculated for the pixel $x_1$ and the pixel $x_3$. In this case, a pixel variance value $V''(x_2)$ of the pixel $x_2$ is obtained by Equation (7) below.

$$V''(x_2) = \frac{E(x_1^2) + E(x_3^2)}{2} - \left\{\frac{E(x_1) + E(x_3)}{2}\right\}^2 \quad (7)$$

$$= \frac{E(x_1^2) - E(x_1)^2 + E(x_3^2) - E(x_3)^2}{2} + \left\{\frac{E(x_1) - E(x_3)}{2}\right\}^2$$

$$= V'(x_2) = \left\{\frac{E(x_1) - E(x_3)}{2}\right\}^2$$

As indicated by Equation (7), the pixel variance value $V''(x_2)$ becomes greater than the pixel variance value $V'(x_2)$ by the square of a half of an estimated difference between the pixel $x_1$ and the pixel $x_3$. Specifically, a difference between the pixel variance value $V'(x_2)$ and the pixel variance value $V''(x_2)$ is smaller in the flat region. However, when the pixel $x_1$ and the pixel $x_3$ are in a region with a large variation, such as a region including an edge, the estimated difference between the pixel $x_1$ and the pixel $x_3$ becomes greater, so that the pixel variance value $V''(x_2)$ becomes greater than the pixel variance value $V'(x_2)$. As a result, the weight coefficient calculated based on the pixel variance value approaches zero in the edge region. In other words, the edge preserving effect can be improved.

In this way, in the noise reduction process according to the third embodiment, it is possible to obtain a higher edge preserving effect than that in the noise reduction process according to the second embodiment.

Fourth Embodiment

An imaging device according to a fourth embodiment performs a noise reduction process on a color image based on RGB three components. The configuration and processes of the imaging device according to the fourth embodiment are substantially the same as those of the imaging device according to the first embodiment explained above with reference to FIG. 1 to FIG. 9.

In the following, differences of the imaging device according to the fourth embodiment from the imaging device according to the first embodiment will be explained. In the image processing unit 100 illustrated in FIG. 2, the similar pixel extracting unit 102 according to the fourth embodiment extracts pixels at which the degree of difference from a pixel of interest is equal to or smaller than a threshold from a window containing the pixel of interest, as similar pixels having similarities equal to or greater than a threshold with respect to the pixel of interest. The Euclidean distance in an RGB space is used as the degree of difference.

The mean calculating unit 103 calculates a three-dimensional RGB vector ($\mu_R$, $\mu_G$, $\mu_B$) as a mean of the similar pixel group for the pixel of interest. The estimating function storage unit 110 stores an estimating function for each of RGB components. The noise variance value calculating unit 106 calculates a noise variance value ($\tau_R^2$, $\tau_G^2$, $\tau_B^2$) based on the mean ($\mu_R$, $\mu_G$, $\mu_B$) and the estimating function for each of the RGB components.

The weight coefficient calculating unit 107 calculates a weight coefficient matrix (W) based on the noise variance value and the mean for each of the colors by Expression (8) below.

$$W \leftarrow \alpha \begin{pmatrix} \frac{\tau_R^2}{\mu_R^2} & 0 & 0 \\ 0 & \frac{\tau_G^2}{\mu_G^2} & 0 \\ 0 & 0 & \frac{\tau_B^2}{\mu_B^2} \end{pmatrix} \quad (8)$$

where $\alpha$ is an arbitrary design parameter.

The correcting unit 108 calculates a correction value x (three-dimensional RGB vector) by Expression (9) below with a pixel value y of a target pixel (three-dimensional RGB vector), the mean $\mu$ (three-dimensional RGB vector) of the similar pixel group for the target pixel, the weight coefficient matrix W (3×3 matrix), and a unit matrix I (3×3 matrix).

$$x \leftarrow W_\mu + (I - W)_y \quad (9)$$

According to the imaging device of the fourth embodiment, it is possible to reduce signal dependent noise in a color image at lower costs without reducing the resolution.

Other configurations and processes of the imaging device according to the fourth embodiment are the same as those of the imaging device according to the other embodiments.

The imaging device according to the fourth embodiment uses a color image based on RGB components as a processing object. However, as a first modification, the imaging device may use a color image expressed in an arbitrary color space, such as a YCC color space or a L*a*b* color space. As another example, the imaging device may use an n-band spectral image as a processing object. In this case, it is possible to perform the noise reduction process by assuming a pixel value (signal value) as an n-dimensional vector.

Figure 13:
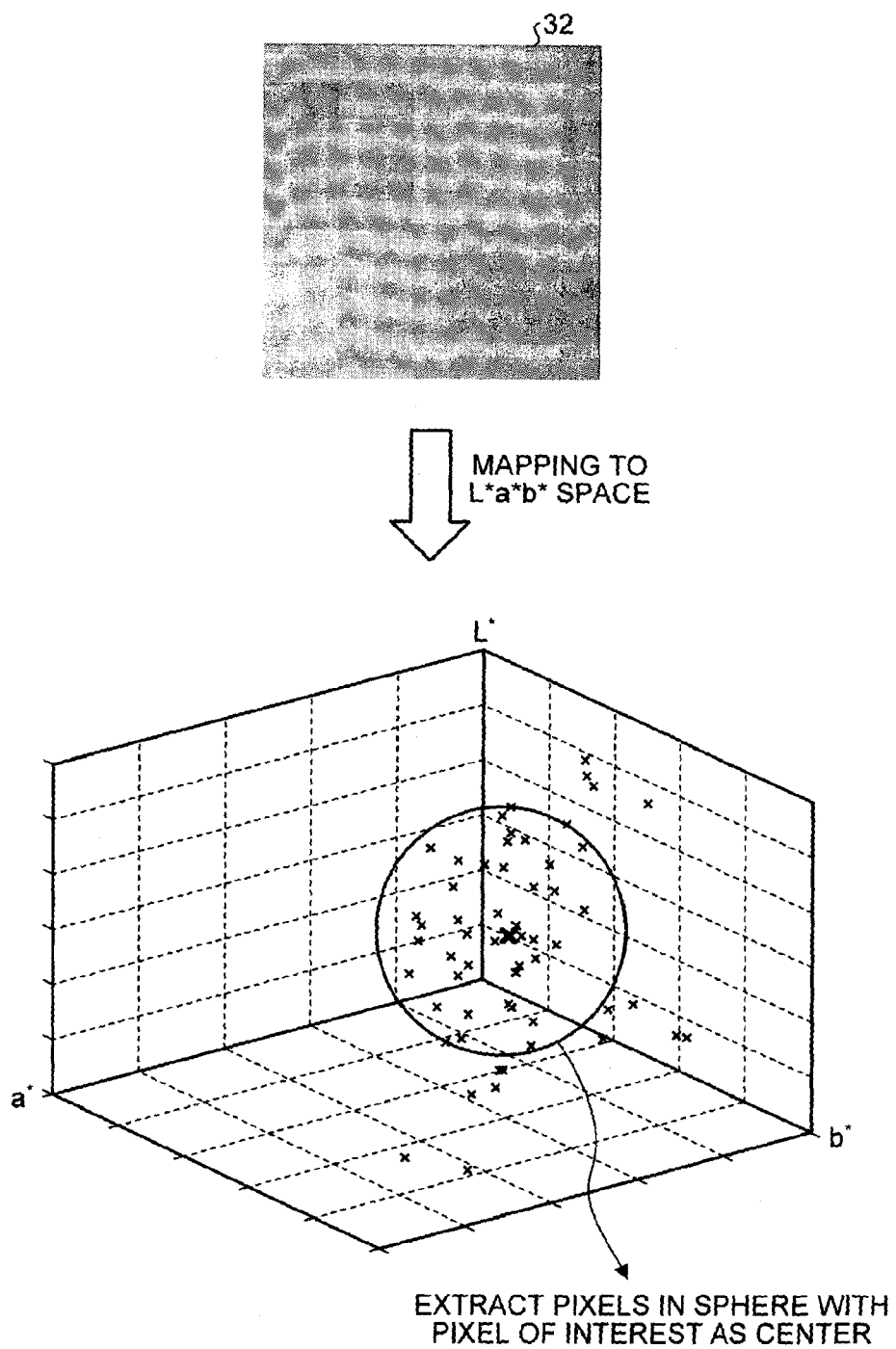
FIG. 13 is a diagram for explaining a process for calculating the Euclidean distance.

As a second modification, it may be possible to use a value other than the Euclidean distance in the RGB space as the degree of difference between pixels. For example, as illustrated in FIG. 13, it may be possible to map the pixels in the window 32 to a L*a*b* space and use the Euclidean distance in the space as the degree of distance. As another example, it may be possible to use the Lp norm or a distance between distributions of pixel values instead of the Euclidean distance. The distance between distributions of pixel values is a distance between the mean of neighboring pixel values around each of the pixels in the window and the mean of neighboring pixel values around the pixel of interest. Details of the distance between distributions of pixel values can be found in Japanese Patent Application Laid-open No. 2011-039675.

Figures 14, 15:
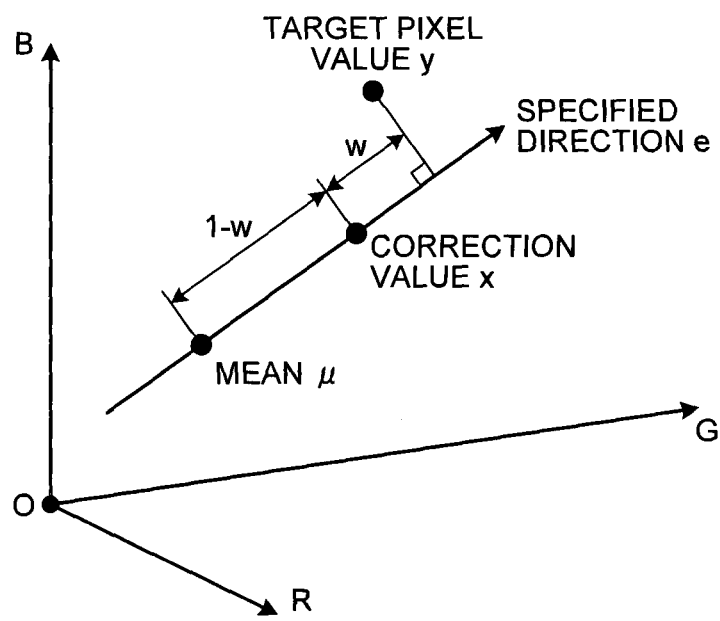
FIG. 14 is a diagram for explaining a specified direction e.
FIG. 15 is a diagram illustrating image data based on Bayer arrangement.

As a third modification, as illustrated in FIG. 14, the correcting unit 108 may project a difference between the pixel value and the mean of the target pixel in a one-dimensional specified direction e and perform weighted addition of the projected pixel value and the projected mean, instead of the correcting unit 108 of the imaging device of the fourth embodiment that performs weighted addition of the pixel value and the mean of a target pixel in the three-dimensional space based on RGB three components. The specified direction e may be a direction determined by an RGB ratio that is the same as the RGB ratio of the mean of the similar pixel group, a direction of the luminance, or a direction of the maximum variance. The direction of the maximum variance will be described later.

The weight coefficient w(p) is a scalar. For example, the weight coefficient calculating unit 107 calculates the weight coefficient w(p) by Expression (10) below.

$$w(p) \leftarrow \frac{\mu_R^2 \tau_R^2 + \mu_G^2 \tau_G^2 + \mu_B^2 \tau_B^2}{\mu_R^4 + \mu_G^4 + \mu_B^4} \qquad (10)$$

In this way, it is possible to reduce the calculations by projecting the three-dimensional pixel value and mean on one-dimensional values. Due to the projection in the specified direction e, it becomes possible to forcibly adjust noise in a direction perpendicular to the specified direction e to zero. Details of a process for calculating a correction value by projecting the three-dimensional pixel value and mean to one-dimensional values in the specified direction e are described in, for example, Japanese Patent Application Laid-open No. 2010-218110.

The direction of the maximum variance will be described below. The correcting unit 108 subtracts a variance-covariance matrix $\Sigma_{noise}$ of noise from a variance-covariance matrix $\Sigma_{image}$ of pixel values of the similar pixel group. The correcting unit 108 also obtains an eigenvalue and an eigenvector of a matrix obtained by the subtracted value, and obtains an eigenvector at which the eigenvalue of the variance-covariance matrix becomes maximum, to thereby obtain the direction of the maximum variance.

The eigenvector of the variance-covariance matrix indicates the direction of variance of given data. The eigenvalue indicates the magnitude of variance in the direction indicated by the eigenvector, that is, the degree of variation. Therefore, the direction of the maximum variance can be obtained by obtaining the eigenvector, at which the eigenvalue of the variance-covariance matrix becomes maximum.

In this way, the correcting unit 108 according to the fourth embodiment functions as a first specified direction calculating unit or a second specified direction calculating unit that calculates the direction of the maximum variance as the specified direction e.

Fifth Embodiment

An imaging device according to a fifth embodiment performs the noise reduction process on a color image, similarly to the imaging device according to the fourth embodiment. The imaging device according to the fifth embodiment calculates a weight coefficient based on a variance-covariance matrix $\Sigma_{image}$ of pixel values of the similar pixel group and a variance-covariance matrix $\Sigma_{noise}$ of noise. The configurations and the processes of the imaging device according to the fifth embodiment are the same as those of the imaging device according to the second embodiment explained above with reference to FIG. 10 and FIG. 11.

In the following, differences of the imaging device according to the fifth embodiment from the imaging device according to the other embodiments will be explained. In the image processing unit 120 illustrated in FIG. 10, the mean-square calculating unit 121 according to the fifth embodiment obtains a mean of the multiplied values of arbitrary two components of the RGB components (R and G, G and B, or B and R). Specifically, the mean-square calculating unit 121 calculates a mean $E(yy^T)$ of a multiplied values $yy^T$ with respect to a three-dimensional RGB vector y of a pixel of interest. Here, T indicates a transposed matrix.

The pixel variance value calculating unit 122 calculates a variance-covariance matrix $\Sigma_{image}$ of the similar pixel group for the pixel of interest based on a mean μ (three-dimensional RGB vector) and a mean square $E(yy^T)$ of the similar pixel group for the pixel of interest by Expression (11) below.

$$\Sigma_{image} \leftarrow E(yy^T) - \mu\mu^T \qquad (11)$$

The upsampling unit 123 performs upsampling and smoothing on the mean μ (three-dimensional RGB vector) and the mean square $E(yy^T)$ calculated for each of the pixels in the downsampled image. The upsampling and smoothing processes are the same as those explained above with reference to FIG. 6.

The weight coefficient calculating unit 124 calculates the weight coefficient matrix W by Expression (12) below.

$$W \leftarrow \{\Sigma_{noise}^{-1}(\Sigma_{image} - \Sigma_{noise})^{-1}\}^{-1}(\Sigma_{image} - \Sigma_{noise})^{-1} \qquad (12)$$

In this way, the weight coefficient calculating unit 124 calculates the weight coefficient based on the variance-covariance matrix $\Sigma_{image}$ of the pixels of the similar pixel group for the target pixel and the variance-covariance matrix $\Sigma_{noise}$ of noise.

The variance-covariance matrix $\Sigma_{noise}$ of noise is calculated by the noise variance value calculating unit 106 by using an estimating function based on the mean of the similar pixel group.

Other configurations and processes of the imaging device according to the fifth embodiment are the same as those of the imaging device according to the other embodiments.

According to the imaging device of the fifth embodiment, variance covariance of the RGB components is used to calculate a weight coefficient for the weighted addition. Therefore, a distribution of pixel values in the RGB space can be reflected in the degree of noise reduction. Consequently, it is possible to reduce noise while preserving RGB weak signals.

Sixth Embodiment

An imaging device according to a sixth embodiment performs the noise reduction process on a color image, similarly to the imaging device according to the fourth and the fifth embodiments. However, while the imaging device according to the fifth embodiment calculates the pixel variance values of the pixels of the downsampled image, the imaging device according to the sixth embodiment does not calculate the pixel variance values of the pixels of the downsampled image. The imaging device according to the sixth embodiment only calculates mean squares of the pixels of the downsampled image, and after upsampling is finished, calculates a pixel variance value of the target pixel based on the mean squares.

The functional configuration and processes of an image processing unit of the imaging device according to the sixth embodiment are the same as those of the imaging device according to the third embodiment explained above with reference to FIG. 10 and FIG. 12.

In the following, differences of the imaging device according to the sixth embodiment from the imaging device according to the other embodiments will be explained. In the image processing unit 120 illustrated in FIG. 10, the upsampling unit 123 according to the sixth embodiment performs upsampling and smoothing on the means calculated by the mean calculating unit 103 and on the mean squares calculated by the mean-square calculating unit 121.

Furthermore, the pixel variance value calculating unit 122 calculates a pixel variance value of a target pixel in a target image based on the mean square ($E(yy^T)$) that has been calculated by the mean-square calculating unit 121 for each of the pixels in the downsampled image or based on the mean squares that have been calculated by the upsampling unit 123 for the pixels decimated by the process performed by the downsampling unit 101.

Other configurations and processes of the imaging device according to the sixth embodiment are the same as those of the imaging device according to the other embodiments.

According to the imaging device of the sixth embodiment, similarly to the imaging device according to the fifth embodiment, it is possible to reduce noise while preserving RGB weak signals. Furthermore, similarly to the relations of the noise reduction process to a grayscale image according to the second and the third embodiments, the characteristics of noise reduction in regions around edges vary in the noise reduction processes on a color image according to the fifth and the sixth embodiments. Therefore, when linear interpolation is applied, a higher edge preserving effect can be obtained in the noise reduction process according to the sixth embodiment than in the noise reduction process according to the fifth embodiment.

Furthermore, as a modification of the imaging device that uses a color image as a processing object, it may be possible to perform the noise reduction process on image data based on Bayer arrangement as illustrated in FIG. 15. Specifically, the image processing unit can perform the noise reduction process explained in the fifth and the sixth embodiments by performing demosaicing on the image data based on Bayer arrangement to convert the image into an RGB image.

Moreover, regarding the processes on the downsampled image, the noise reduction process on a grayscale image according to the first to the third embodiments may be performed on each of color components in the Bayer arrangement, the image data based on Bayer arrangement may be converted into an RGB image in the upsampling and smoothing processes, and the noise reduction process performed on a color image according to the fourth to the sixth embodiments may be performed on the RGB image.

The imaging device according to the embodiments can preferably be applied to any device that captures an image, such as a digital camera, a scanner, or a mobile phone with a camera.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An image processing apparatus comprising:
   circuitry configured to:
   decimate pixels in a target image to be processed to obtain a decimated image containing a smaller number of pixels than the target image;
   extract similar pixels at each of which a similarity to a pixel of interest to be processed is equal to or greater than a first threshold, from a region containing the pixel of interest among pixels contained in the decimated image;
   calculate a first correction candidate value used to correct a pixel value, based on pixel values of the similar pixels;
   calculate a second correction candidate value for each of the pixels, based on the first correction candidate value calculated for each of the pixels contained in the decimated image;
   calculate a weight coefficient of a target pixel value and the first or second correction candidate value of the target pixel, based on the first or second correction candidate value of the target pixel, wherein the target pixel value is a value of a target pixel to be corrected in the target image; and
   correct the target pixel value of the target pixel, based on the first correction candidate value or the second correction candidate value, wherein the target pixel value is corrected by performing weighted addition of the target pixel value and the first or second correction candidate value by using the weight coefficient.

2. The image processing apparatus according to claim 1, wherein the circuitry is further configured to extract a low-frequency component having a predetermined frequency or smaller from the target image,
   wherein, when decimating the pixels, the circuitry is further configured to decimate a pixel corresponding to the low-frequency component from the target image to obtain the decimated image.

3. The image processing apparatus according to claim 2, wherein, when calculating the first correction candidate value, the circuitry is further configured to calculate a mean of the pixel values of the similar pixels as the first correction candidate value.

4. The image processing apparatus according to claim 3, wherein the circuitry is further configured to:
   store therein a noise variance estimating function indicating a relationship between the first or second correction candidate value of the target pixel and noise variance values of the similar pixels of the target pixel; and
   calculate a noise variance value of the target pixel based on the first or second correction candidate value and the noise variance estimating function,
   wherein, when calculating the weight coefficient, the circuitry is further configured to calculate the weight coefficient based on the noise variance value.

5. The image processing apparatus according to claim 4, wherein the circuitry is further configured to:
   calculate a mean square of the pixel values of the extracted similar pixels for each of the pixels contained in the decimated image;
   calculate a pixel variance value for the pixel value of each of the pixels in the decimated image, based on the mean square of each of the pixels contained in the decimated image; and
   calculate a pixel variance value for each of the decimated pixels, based on the pixel variance value calculated for each of the pixels in the decimated image,
   wherein, when calculating the weight coefficient, the circuitry is further configured to calculate the weight coefficient based on the noise variance value and the pixel variance value.

6. The image processing apparatus according to claim 4, wherein the circuitry is further configured to:
   calculate a first mean square of the pixel values of the extracted similar pixels for each of the pixels contained in the decimated image;
   calculate a second mean square of the pixel values of the similar pixels with respect to each of the decimated pixels, based on the first mean square calculated for each of the pixels in the decimated image; and
   calculate a pixel variance value of the pixel values of the similar pixels of the target pixel, based on the first mean square or the second mean square,
   wherein, when calculating the weight coefficient, the circuitry is further configured to calculate the weight coefficient based on the noise variance value and the pixel variance value.

7. The image processing apparatus according to claim 3, wherein the target image is a color image, and
   wherein, when correcting the target pixel value, the circuitry is further configured to:
   project a difference between the target pixel value and the first or second correction candidate value of the target pixel in a first specified direction within a predetermined color space; and perform weighted addition of the target pixel value and the first or second correction candidate value projected in the first specified direction by using the weight coefficient, to correct the target pixel value to a value in the first specified direction.

8. The image processing apparatus according to claim 7, wherein the circuitry is further configured to:

calculate a maximum variance direction as the first specified direction based on pixel values of the similar pixels and variance-covariance of noise with respect to the target pixel value of the target pixel, and wherein, when correcting the target pixel value, the circuitry is further configured to correct the target pixel value by using the first specified direction.

9. The image processing apparatus according to claim 8, wherein the target image is a specular image, and wherein, when correcting the target pixel value, the circuitry is further configured to:

project a difference between the target pixel value and the first or second correction candidate value of the target pixel in a second specified direction within a specular space, and perform weighted addition of the target pixel value and the first or second correction candidate value by using the weight coefficient, to correct the target pixel value to a value in the second specified direction.

10. The image processing apparatus according to claim 9, wherein the circuitry is further configured to:

calculate a maximum variance direction as the second specified direction based on pixel values of the similar pixels and variance-covariance of noise with respect to the target pixel value of the target pixel, wherein, when correcting the target pixel value, the circuitry is further configured to correct the target pixel value by using the second specified direction.

11. An imaging device comprising:

the image processing apparatus according to claim 1; and circuitry configured to:

capture an image;

store a plurality of noise variance estimating functions, each indicating a relationship between the first or second correction candidate value of the target pixel and the noise variance value of each of the similar pixels of the target pixel and each being associated with an imaging condition;

acquire an imaging condition set in the circuitry or an imaging condition input from an external apparatus;

select a noise variance estimating function that is stored in association with the acquired imaging condition;

calculate a noise variance value of the target pixel based on the selected noise variance estimating function and based on the first or second correction candidate value, wherein, when calculating the weight coefficient, the circuitry is further configured to calculate the weight coefficient of the target pixel value and the first or second correction candidate value of the target pixel based on the noise variance value.

12. An image processing method implemented by an image processing apparatus, the image processing method comprising:

decimating pixels in a target image to be processed to obtain a decimated image containing a smaller number of pixels than the target image;

extracting similar pixels at each of which a similarity to a pixel of interest to be processed is equal to or greater than a first threshold, from a region containing the pixel of interest among pixels contained in the decimated image;

calculating a first correction candidate value used to correct a pixel value, based on pixel values of the similar pixels;

calculating a second correction candidate value for each of the pixels decimated at the decimating, based on the first correction candidate value calculated for each of the pixels contained in the decimated image;

calculating a weight coefficient of a target pixel value and the first or second correction candidate value of the target pixel, based on the first or second correction candidate value of the target pixel, wherein the target pixel value is a value of a target pixel to be corrected in the target image; and correcting the target pixel value of the target pixel, based on the first correction candidate value or the second correction candidate value, wherein the target pixel value is corrected by performing weighted addition of the target pixel value and the first or second correction candidate value by using the weight coefficient.

13. A non-transitory computer-readable recording medium with an executable program stored thereon, wherein the program instructs a computer to perform:

decimating pixels in a target image to be processed to obtain a decimated image containing a smaller number of pixels than the target image;

extracting similar pixels at each of which a similarity to a pixel of interest to be processed is equal to or greater than a first threshold, from a region containing the pixel of interest among pixels contained in the decimated image;

calculating a first correction candidate value used to correct a pixel value, based on pixel values of the similar pixels;

calculating a second correction candidate value for each of the pixels decimated at the decimating, based on the first correction candidate value calculated for each of the pixels contained in the decimated image;

calculating a weight coefficient of a target pixel value and the first or second correction candidate value of the target pixel, based on the first or second correction candidate value of the target pixel, wherein the target pixel value is a value of a target pixel to be corrected in the target image; and correcting the target pixel value of the target pixel, based on the first correction candidate value or the second correction candidate value, wherein the target pixel value is corrected by performing weighted addition of the target pixel value and the first or second correction candidate value by using the weight coefficient.

* * * * *